(12) United States Patent
Matoba et al.

(10) Patent No.: US 6,608,655 B2
(45) Date of Patent: *Aug. 19, 2003

(54) LIQUID CRYSTAL DISPLAY DEVICE INCLUDING IDENTICAL SHAPE DUMMY WIRE SURROUNDING EACH PIXEL AND CAPABLE OF REDUCING THE INFLUENCE OF PARASITIC CAPACITIES

(75) Inventors: Masakazu Matoba, Yamatokoriyama (JP); Yohsuke Fujikawa, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/996,936

(22) Filed: Nov. 30, 2001

(65) Prior Publication Data

US 2002/0033924 A1 Mar. 21, 2002

Related U.S. Application Data

(62) Division of application No. 09/207,403, filed on Dec. 8, 1998, now Pat. No. 6,333,771.

(30) Foreign Application Priority Data

Dec. 26, 1997 (JP) .............................. 9-361245

(51) Int. Cl.[7] ...................... G02F 1/1333; G02F 1/136; G02F 1/13; G09G 3/36
(52) U.S. Cl. ...................... 349/54; 349/40; 349/41; 349/51; 349/192; 345/93
(58) Field of Search .................. 349/38, 40, 41, 349/51, 54, 139, 192, 143; 345/92, 93

(56) References Cited

U.S. PATENT DOCUMENTS

| 5,177,743 | A |   | 1/1993  | Shinoda et al. ........... 714/702 |
| 5,285,301 | A | * | 2/1994  | Shirahashi et al. ....... 349/143 |
| 5,446,562 | A |   | 8/1995  | Sato ........................... 349/42 |
| 5,767,929 | A |   | 6/1998  | Yachi et al. ................ 349/40 |
| 5,838,411 | A |   | 11/1998 | Hayakawa et al. ........ 349/139 |
| 5,847,381 | A |   | 12/1998 | Isogai ......................... 250/208 |
| 5,867,139 | A |   | 2/1999  | Tanaka et al. ............. 345/92 |
| 5,946,068 | A |   | 8/1999  | Lee et al. ................... 349/143 |
| 5,982,470 | A |   | 11/1999 | Nakahara et al. ......... 349/153 |
| 6,014,191 | A |   | 1/2000  | Kim et al. .................. 349/54 |
| 6,111,621 | A |   | 8/2000  | Kim et al. .................. 349/54 |
| 6,169,530 | B1|   | 1/2001  | Mori et al. ................. 345/93 |

FOREIGN PATENT DOCUMENTS

| JP | 61-140982 A | 6/1986  |
| JP | 62-4724 U   | 1/1987  |
| JP | 62-58226 A  | 3/1987  |
| JP | 64-3630     | 1/1989  |
| JP | 01105219    | 4/1989  |
| JP | 01133032    | 5/1989  |
| JP | 2-7024 A    | 1/1990  |
| JP | 3-138973 A  | 6/1991  |
| JP | 4-73951 A   | 3/1992  |
| JP | 05-027268   | 2/1993  |
| JP | 5-72557 A   | 3/1993  |
| JP | 7-28096 A   | 1/1995  |
| JP | 07-013177   | 1/1995  |
| JP | 7-84239 A   | 3/1995  |
| JP | 9-288260 A  | 11/1997 |

* cited by examiner

Primary Examiner—Tarifur R. Chowdhury
(74) Attorney, Agent, or Firm—Birch, Stewart, Kolasch & Birch, LLP

(57) ABSTRACT

A dummy wire is provided on the outside of pixel electrodes disposed on the right end so as to apply the same amount of parasitic capacity as a neighboring signal wire applies. Further, on the outside of the pixel electrodes disposed on the upper or lower end, another dummy wire is provided so as to apply the same amount of parasitic capacity as a neighboring pixel electrode applies. With this arrangement, with regard to a liquid crystal display device with a matrix driving system, it is possible to provide the liquid crystal display device which reduces the influence caused by a difference in parasitic capacity so that an even display can be realized.

6 Claims, 22 Drawing Sheets

LIQUID CRYSTAL DISPLAY DEVICE INCLUDING IDENTICAL SHAPE DUMMY WIRE SURROUNDING EACH PIXEL AND CAPABLE OF REDUCING THE INFLUENCE OF PARASITIC CAPACITIES

This application is a divisional of application Ser. No. 09/207,403 filed on Dec. 8, 1998, U.S. Pat. No. 6,333,771 the entire contents of which are hereby incorporated by reference and for which priority is claimed under 35 U.S.C. § 120; and this application claims priority of Application Nos. 9-361245, filed in Japan on Dec. 26, 1997 under 35 U.S.C. § 119.

FIELD OF THE INVENTION

The present invention relates to a liquid crystal display device, and particularly relates to a liquid crystal display device which provides a display by a matrix driving system.

BACKGROUND OF THE INVENTION

In recent years, a liquid crystal display device has been widely used for providing a display of a personal computer, a word processor, a terminal display device for office automation, and a television and others thanks to its low power consumption, thin structure, and light weight. Accordingly, a display with a larger capacity and higher picture quality has been demanded.

A conventional liquid crystal display device has performed a simple-matrix driving in accordance with a voltage averaging method of the STN (Super Twisted Nematic) system. However, since a sufficient contrast ratio cannot be obtained due to the increase of scanning lines, this method is not suitable for a display with a large capacity. Therefore, an active-matrix driving has been developed to provide a switching element on each of the pixels constituting a display screen.

As the aforementioned switching element, a thin-film transistor and a two-terminal nonlinear element are used, and the liquid crystal display device with the two-terminal nonlinear element has been highly evaluated because of the simple construction and low manufacturing cost. A device having a structure of metal-insulator-metal (hereinafter, referred to as MIM) has been put into practical use. For example, a conventional MIM element is produced as follows:

Firstly, as shown in FIGS. 19 and 20, on a glass substrate 51, a tantalum thin-film, which is formed to be a signal wire 52 and a lower electrode 53, is laminated with a thickness of 3000 Å in accordance with a sputtering method, etc., and is patterned into a predetermined form so as to obtain the signal wire 52 and the lower electrode 53 by a photolithography method. Thereafter, in accordance with an anodic oxidation method, an anodic oxidation is performed on the surface of the lower electrode 53 so that an insulating film 54 is formed with a thickness of 600 Å.

And then, in this state, titanium formed to be an upper electrode 55 is laminated on the entire area of the substrate with a thickness of 4000 Å by the sputtering method, etc., and is patterned into a predetermined form by the photolithography method so as to be formed as the upper electrode 55.

Further, a transparent electrode film which is made of ITO and others is laminated on the substrate, and the substrate is subjected to patterning so as to form a pixel electrode 56. FIG. 21 illustrates an arrangement pattern of pixels composed of MIM elements and pixel electrodes 56, said MIM elements and pixel electrodes 56 being formed in accordance with the aforementioned process.

As described in FIG. 21, in the liquid crystal display device which uses the matrix driving system, a parasitic capacity appears in each pixel due to the effects of neighboring pixels and wires. Further, in addition to the case of the aforementioned liquid crystal display device which uses a two-terminal element such as an MIM element and others, the parasitic capacity appears to some extent even in the case of a liquid crystal display device using other active elements or in the case of a liquid crystal display device using the simple-matrix driving system. Especially, in the case of the liquid crystal display device which uses the two-terminal elements, the effect of the parasitic capacity becomes the greatest.

That is, in the case of the liquid crystal display device using the two-terminal element as a switching element, when an element capacity varies in accordance with a change in element dimensions and others of the two-terminal element, a threshold voltage $V_{th}$ varies accordingly; therefore, a lighting condition differs between pixels. Consequently, with regard to all pixels, it is significant to obtain uniform capacity ratios of a pixel capacity and the element capacity. The pixel capacity is a capacity of the pixel electrode 56, and the element capacity is a capacity of the MIM element. Here, the parasitic capacity greatly influences the capacity ratio.

The specific explanation will be given in accordance with FIG. 21. Based upon one pixel (sample pixel) among a plurality of pixels which are arranged in a matrix form, signal wires 52a and 52b, which are respectively disposed on the left and right of the sample pixel, add respectively parasitic capacities C1 and C2 to a pixel electrode 56a of the sample pixel. Further, a pixel electrode 56b of a pixel which exists above the sample pixel adds a parasitic capacity C3, and a pixel electrode 56c of a pixel which exists below the sample pixel adds a parasitic capacity C4.

The parasitic capacities C1 through C4 are added to the pixel capacity of the pixel electrode 56a, thereby having an effect on the capacity ratio of the pixel capacity and the element capacity. Namely, with regard to the respective pixels, even if element dimensions of the two-terminal element are arranged so as to be uniform in order to keep the element capacity at a certain amount, the capacity ratio of the pixel capacity and the element capacity varies in accordance with a change in the parasitic capacity.

However, in the conventional arrangement, as shown in FIG. 22, pixel electrodes 56d, which exist on the right end, do not have the signal wire 52 on its right; therefore, the parasitic capacity C2 is not added. Further, pixel electrodes 56e, which exist on the upper end or the lower end, do not have the pixel electrodes 56 above or below; thus, the parasitic capacity C3 or C4 is not added. Moreover, in the case of pixel electrodes 56f, which exist on the upper right corner or the lower right corner, parasitic capacities C2 and C3 are not added, or parasitic capacities C2 and C4 are not added.

Hence, with regard to the liquid crystal display device which uses the aforementioned MIM element, each of the parasitic capacities which are applied to the pixel electrodes 56d, 56e or 56f is smaller than the parasitic capacity which is applied to the pixel 56a, illustrated in FIG. 21. Consequently, since a lighting condition differs between pixels, it becomes impossible to provide an even lighting display.

Namely, as illustrated in FIG. 22, with regard to pixels which exist on the upper end, lower end, and on the right end (pixels indicated by slanting lines in FIG. 22), the threshold voltage $V_{th}$ becomes lower, resulting in an uneven display. Therefore, for example, in the case of a gradation display, this arrangement causes adverse effects.

SUMMARY OF THE INVENTION

With regard to a liquid crystal display device with the matrix driving system, the objective of the present invention is to provide a liquid crystal display device which is capable of reducing the influence caused by a difference in parasitic capacity so as to provide an even display.

In order to achieve the aforementioned objective, the liquid crystal display device of the present invention, in which a plurality of pixels forming a display screen are arranged in a matrix form and all pixels forming each pixel line are connected with a signal wire for each of the pixel lines, is provided with a first dummy wire which is formed on the outside of the final pixel line with no neighboring signal wire other than a signal wire being connected with the final pixel line, and which applies to the pixel electrodes of the final pixel line the same amount of parasitic capacity as a between-line parasitic capacity which is applied from a neighboring signal wire, wherein the first dummy wire is electrically connected with the neighboring signal wire.

With the aforementioned liquid crystal display device, the first dummy wire applies to the pixel electrodes of the final pixel line the same amount of parasitic capacity as the between-line parasitic capacity which is applied from the neighboring signal wire. Therefore, with regard to pixel electrodes of the final pixel line, it is possible to apply the same amount of parasitic capacity as other pixel electrodes.

With this arrangement, it is possible to solve the uneven image display which has been caused by the difference in parasitic capacity applied to each of the pixel electrodes. Consequently, an even lighting display is achieved. Further, since the first dummy wire is electrically connected with the neighboring signal wire, it is easy to arrange wires. For example, even in the case of a liquid crystal panel with a centrally divided structure, this arrangement does not cause the expansion of dot pitch, the decrease of yield, and other demerits in a divided portion at the center.

Furthermore, in order to achieve the aforementioned objective, another liquid crystal display device of the present invention, in which a plurality of pixels forming a display screen are arranged in a matrix form and all pixels forming each pixel line are connected with a signal wire for each of the pixel lines, is characterized in that all pixel electrodes that constitute the display screen are surrounded by dummy wires having an identical shape.

With the aforementioned crystal display device, all pixel electrodes are surrounded by the dummy wires having an identical shape. Therefore, the same amount of parasitic capacity is applied to a pixel electrode of each pixel.

With this arrangement, it is possible to solve the uneven image display which has been caused by the difference in parasitic capacity applied to the respective pixel electrodes. Therefore, it is possible to achieve an even lighting display. Furthermore, since a signal wire is doubled by the dummy wire, it is possible to provide redundancy, and to reduce the resistance of the signal wire so that it becomes possible to decrease power consumption of the liquid crystal panel.

Moreover, in order to achieve the aforementioned objective, the liquid crystal display device of the present invention, in which a plurality of pixels forming a display screen are arranged in a matrix form and all pixels forming each pixel line are connected with a signal wire for each of the pixel lines, is characterized in that intervals between pixel electrodes on each pixel line, as well as intervals between pixel electrodes disposed on each pixel line and the signal wires which are adjacent to the pixel electrodes are expanded so that parasitic capacities applied to the respective pixel electrodes do not affect the display image.

In the aforementioned liquid crystal display device, intervals between pixel electrodes on each pixel line, as well as intervals between pixel electrodes disposed on each pixel line and signal wires which are adjacent to the pixel electrodes, are expanded so that the influence of parasitic capacity is reduced in each pixel electrode. Hence, it is possible to solve the uneven image display which has been caused by the difference in parasitic capacity applied to each of the pixel electrodes so that an even lighting display can be achieved. Furthermore, at the same time, it is possible to reduce driving voltage for lighting so that low power consumption can be realized.

For a fuller understanding of the nature and advantages of the invention, reference should be made to the ensuing detailed description taken in conjunction with the accompanying drawings.

DESCRIPTION OF THE EMBODIMENTS

[Embodiment 1]

Referring to FIGS. 1 through 9, the following explanation describes one embodiment of the present invention.

The liquid crystal display device of the present embodiment is provided with a liquid crystal panel whose pixels are arranged in a matrix form. Here, as an example, this embodiment exemplifies a case wherein each pixel of the liquid crystal panel uses a two-terminal element such as an MIM element shown in FIGS. 2 and 3 as a switching element.

Figure 2:
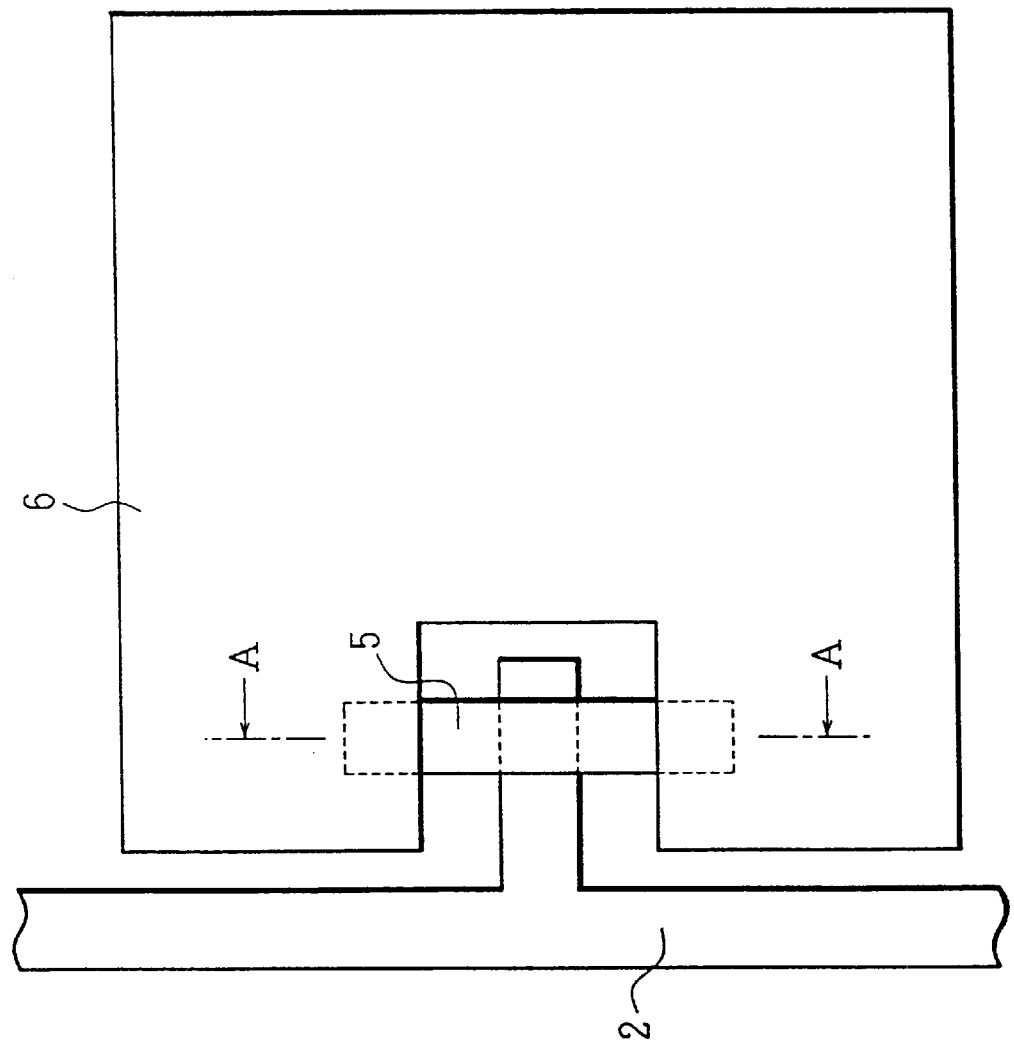
FIG. 2 is a top view showing the construction of a pixel which uses a two-terminal element as a switching element in the liquid crystal display device.
Figure 3:
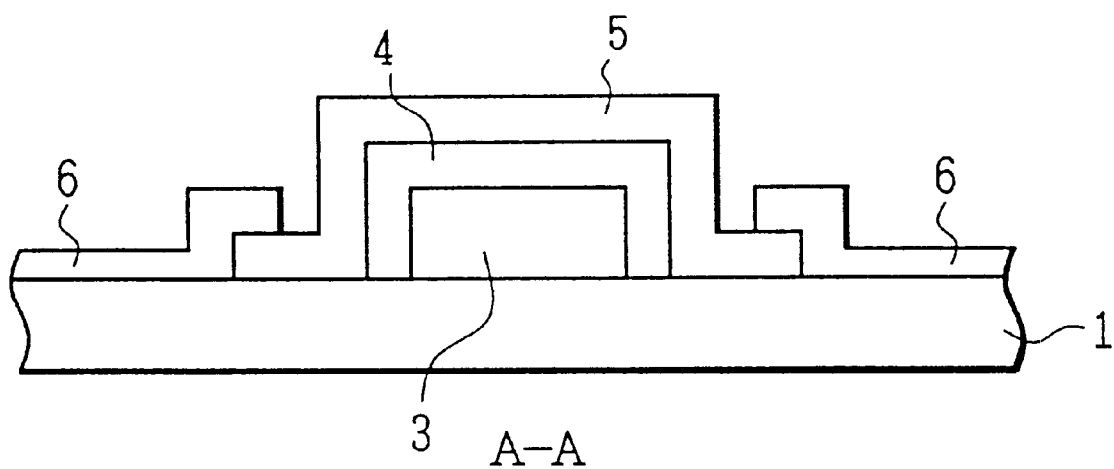
FIG. 3 is an A—A cross section showing the pixel.

As shown in FIGS. 2 and 3, a signal wire 2 and a lower electrode 3, which are obtained by allowing a tantalum thin film to be patterned into a predetermined form on a glass substrate 1, are formed in the aforementioned pixel. Further, an insulating film 4 is formed on the surface of the lower electrode 3 in accordance with an anodic oxidation method.

An upper electrode 5, which is obtained by allowing a titanium thin film to be patterned into a predetermined form, is formed on the lower electrode 3. A pixel electrode 6, which is obtained by allowing a transparent film made of ITO and others to be patterned, is formed on the upper electrode 5.

As described above, in the case of the liquid crystal display device which is provided with the liquid crystal panel whose pixels are arranged in a matrix form, a parasitic capacity appears due to the influence of pixels and wires which are adjacent to each pixel. If the parasitic capacity differs between pixels, it becomes impossible to achieve a uniform image display, as mentioned in Prior Art.

Furthermore, based upon one pixel (sample pixel) of the liquid crystal panel, the present embodiment defines the arrangement of pixels and wires which are adjacent to the sample pixel as follows. Here, the sample pixel is not supposed to belong to any lines disposed on the upper end, the lower end, and the right end of the liquid crystal panel.

Figure 4:
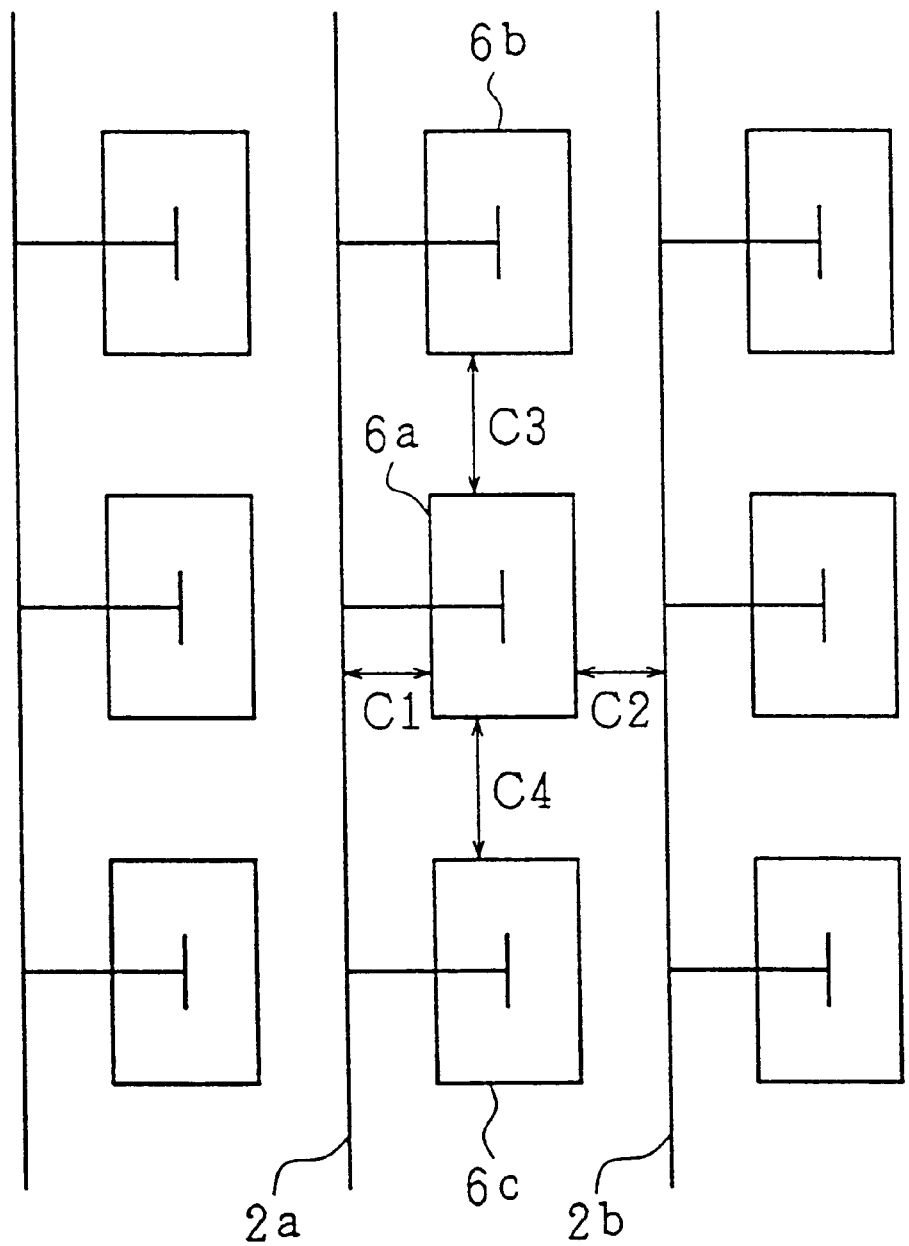
FIG. 4 is an explanatory drawing showing parasitic capacities applied to a sample pixel.

As described in FIG. 4, a pixel electrode 6a represents the pixel electrode of the sample pixel, a pixel electrode 6b represents a pixel electrode of a pixel which is disposed above the sample pixel, and a pixel electrode 6c represents a pixel electrode of a pixel which is disposed below the sample pixel. Moreover, among two signal wires which are adjacent to the sample pixel, a signal wire 2a represents a signal wire which is connected with the sample pixel, and a signal wire 2b represents the other signal wire which is not connected with the sample pixel.

As described above, with regard to the pixel electrode 6a of the pixel which is surrounded by other pixels and signal wires from all directions, the signal wires 2a and 2b add parasitic capacities C1 and C2 serving as between-line parasitic capacities, and the pixel electrodes 6b and 6c add parasitic capacities C3 and C4 serving as between-pixels parasitic capacities. Namely, with regard to the pixel electrode 6a, four kinds of parasitic capacities, that is, the parasitic capacities C1 through C4 appear.

Figure 22:
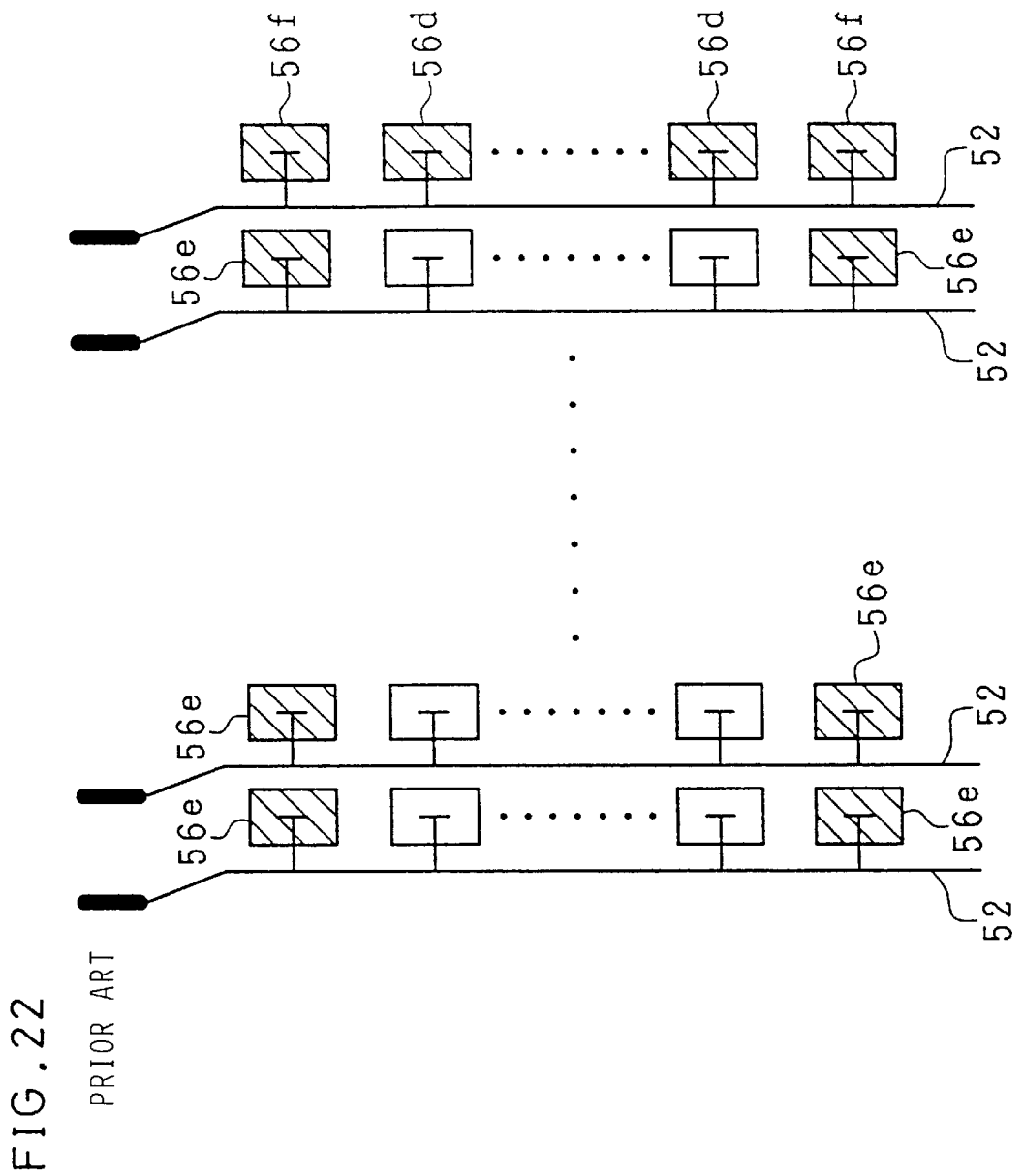
FIG. 22 is an explanatory drawing showing a pattern formation of electrodes in the conventional liquid crystal display device.

By contrast, with regard to pixels which are disposed on the upper end, the lower end, and the right end, as described in Prior Art, only two or three kinds of the aforementioned four parasitic capacities C1 through C4 appear. This causes an uneven lighting display as shown in FIG. 22.

Figure 1:
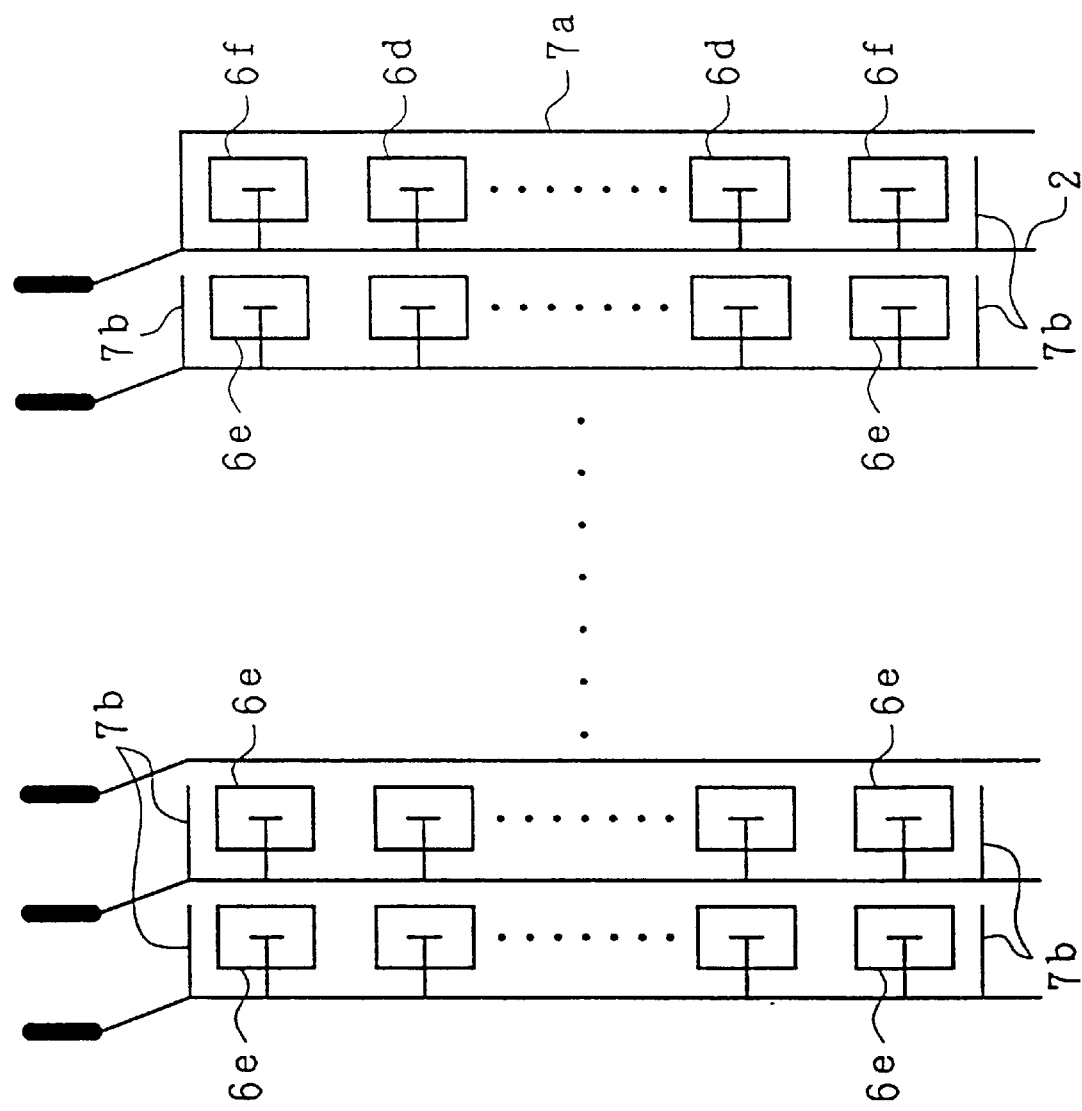
FIG. 1 is an explanatory drawing which shows an embodiment of the present invention and a pattern formation of pixels and wires in a liquid crystal display device.

In order to improve the uneven lighting display, the liquid crystal display device of the present embodiment is, as shown in FIG. 1, provided with dummy wires 7a and 7b for applying even parasitic capacities to all pixels.

The dummy wire 7a is installed for providing the pixel which is disposed on the right end with a parasitic capacity corresponding to the parasitic capacity C2, and is formed on the right of the right end, in parallel with the signal wire 2. Further, the dummy wire 7b is installed for providing a pixel which is disposed on the upper end or the lower end with a parasitic capacity corresponding to the parasitic capacity C3 or C4. The dummy wire 7b, located above the upper end or below the lower end, intersects the signal wire 2 at right angles, and extends from the signal wire 2. The pixel is connected with the signal wire 2. The same voltage as the signal wire 2 is applied to the dummy wires 7a and 7b.

Moreover, the dummy wire 7a is electrically connected with the signal wire 2 disposed on the right end so as to apply the aforementioned voltage. For this reason, with regard to the pixel disposed at the upper right corner, instead of the dummy wire 7b, the wire, which connects the dummy wire 7a with the signal wire 2 disposed on the right end, applies the parasitic capacity C3.

With the aforementioned arrangement, with regard to pixel electrodes 6d of pixels disposed on the right end (except for pixels at the upper right corner and the lower right corner), the dummy wire 7a applies the parasitic capacity C2. With regard to pixel electrodes 6e of the pixels disposed on the upper end and the lower end (except for pixels at the upper right corner and the lower right corner), the dummy wire 7b applies the parasitic capacities C3 or C4. Further, with regard to a pixel electrode 6f disposed at the upper right corner or the lower right corner, the dummy wires 7a and 7b apply the parasitic capacity C2 as well as the parasitic capacity C3 or C4.

Furthermore, in the present embodiment, the pixel electrodes 6d and 6f correspond to pixel electrodes on the final pixel line. The pixel electrodes 6e and 6f correspond to pixel electrodes of pixels which are disposed on ends. Moreover, a first dummy wire corresponds to the dummy wire 7a, and a second dummy wire corresponds to the dummy wire 7b.

Here, the following explanation shows an example of a calculation of each of parasitic capacities C1 through C4 which are applied to the pixel electrode 6 and a calculation of the total amount of parasitic capacities applied to each pixel electrode. Further, the following calculations are carried out by assuming that the dot pitch: 0.24 mm, the pixel construction: 480×320 dots, and the panel size: approximately 5 inches.

<Calculation of the Parasitic Capacities C1 through C4>

As mentioned above, the parasitic capacities C1 through C4 appear between pixels or between a pixel and a neighboring signal wire. Here, the area of an opposing surface is 240 µm×1 µm (film thickness), and a gap between the opposing surfaces (a width indicated by an arrow in FIG. 4) is 6 µm. A dielectric constant $\epsilon$ of liquid crystal, which is generally 8 to 12, is set at $\epsilon=10$ as a representative constant here. Further, a vacuum dielectric constant is represented by $8.86\times10^{-12}$ $Fm^{-1}$.

The parasitic capacity C1 ($\approx$C2$\approx$C3$\approx$C4)
$\approx 8.86\times10^{-12}\times(240\times10^{-6}\times1\times10^{-6})\times10$
$\div(6\times10^{-6})$
$\approx 3.54\times10^{-15}F$ <Total of Parasitic Capacities>
(In the Case of No Dummy Wire)
The total of parasitic capacities of the pixel electrode 6a
(C1+C2+C3+C4)
$\approx 14.16\times10^{-15}F$
>the total of parasitic capacities of the pixel electrode 6d
(C1+C3+C4)
$\approx$the total of parasitic capacities of the pixel electrode 6e
(C1+C2+C4)
$\approx 10.62\times10^{-15}F$
>the total of parasitic capacities of the pixel electrode 6f
(C1+C4)
$\approx 7.08\times10^{-15}F$
(In the Case when Dummy Wires Exist)
The total of parasitic capacities of the pixel electrode 6a
(C1+C2+C3+C4)
$\approx$the total of parasitic capacities of the pixel electrode 6d
(C1+C2+C3+C4)
$\approx$the total of parasitic capacities of the pixel electrode 6e
(C1+C2+C3+C4)
$\approx$the total of parasitic capacities of the pixel electrode 6f
(C1+C2+C3+C4)
$\approx 14.16\times10^{-15}F$ (C1+C2+C3+C4)

According to the above calculation result, the dummy wires 7a and 7b allow each parasitic capacity of the pixel electrodes 6d through 6f to be set at the same as the parasitic capacity of the pixel electrode 6a; therefore, it is possible to achieve an even lighting display for each pixel.

Furthermore, the way to connect the dummy wires 7a and 7b is not limited to the arrangement as shown in FIG. 1. For example, as shown in FIG. 5, the dummy wire 7b is allowed to extend from the signal wire 2b, not from the signal wire 2a as shown in FIG. 4.

Figure 5:
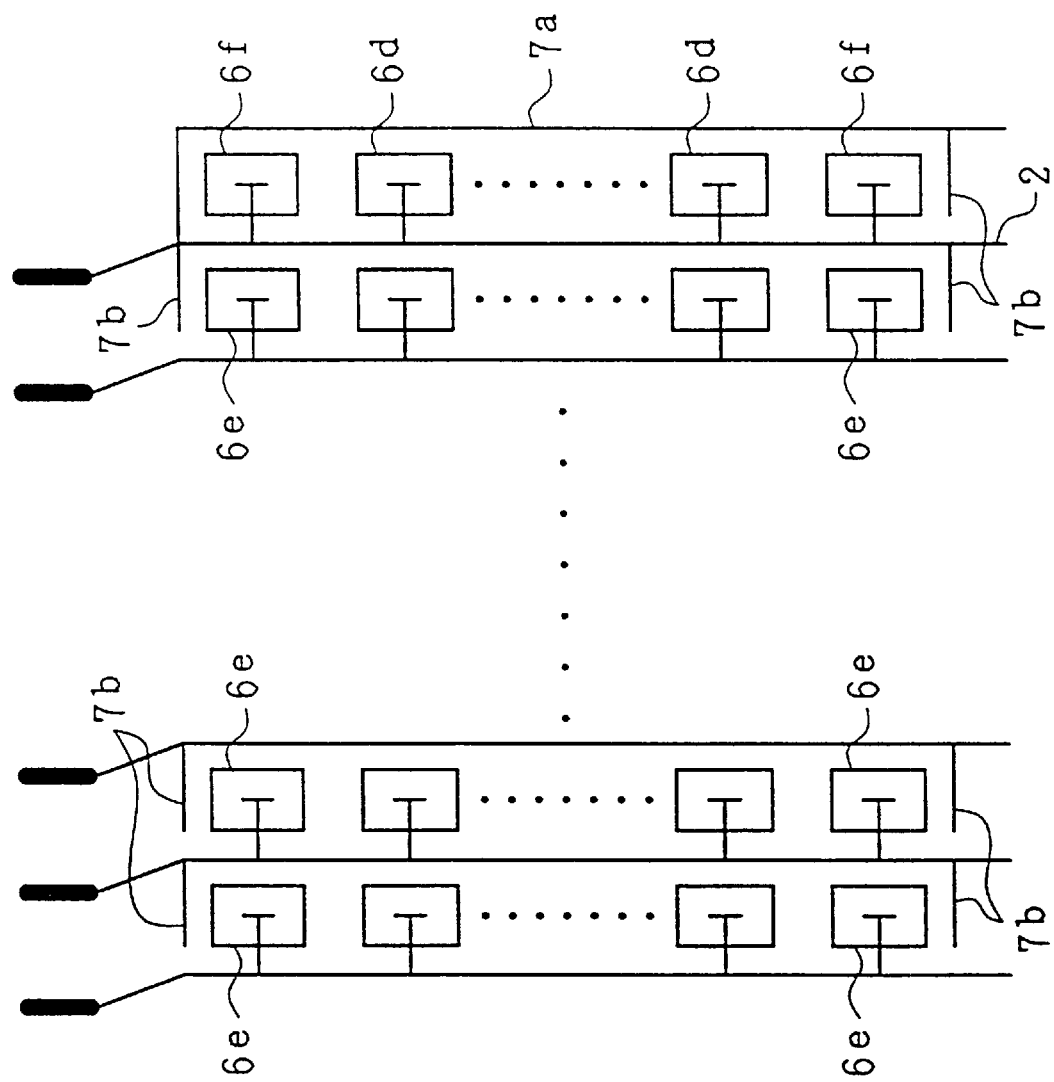
FIG. 5 is an explanatory drawing showing another embodiment of the present invention and a pattern formation of pixels and wires in the liquid crystal display device.
Figure 6:
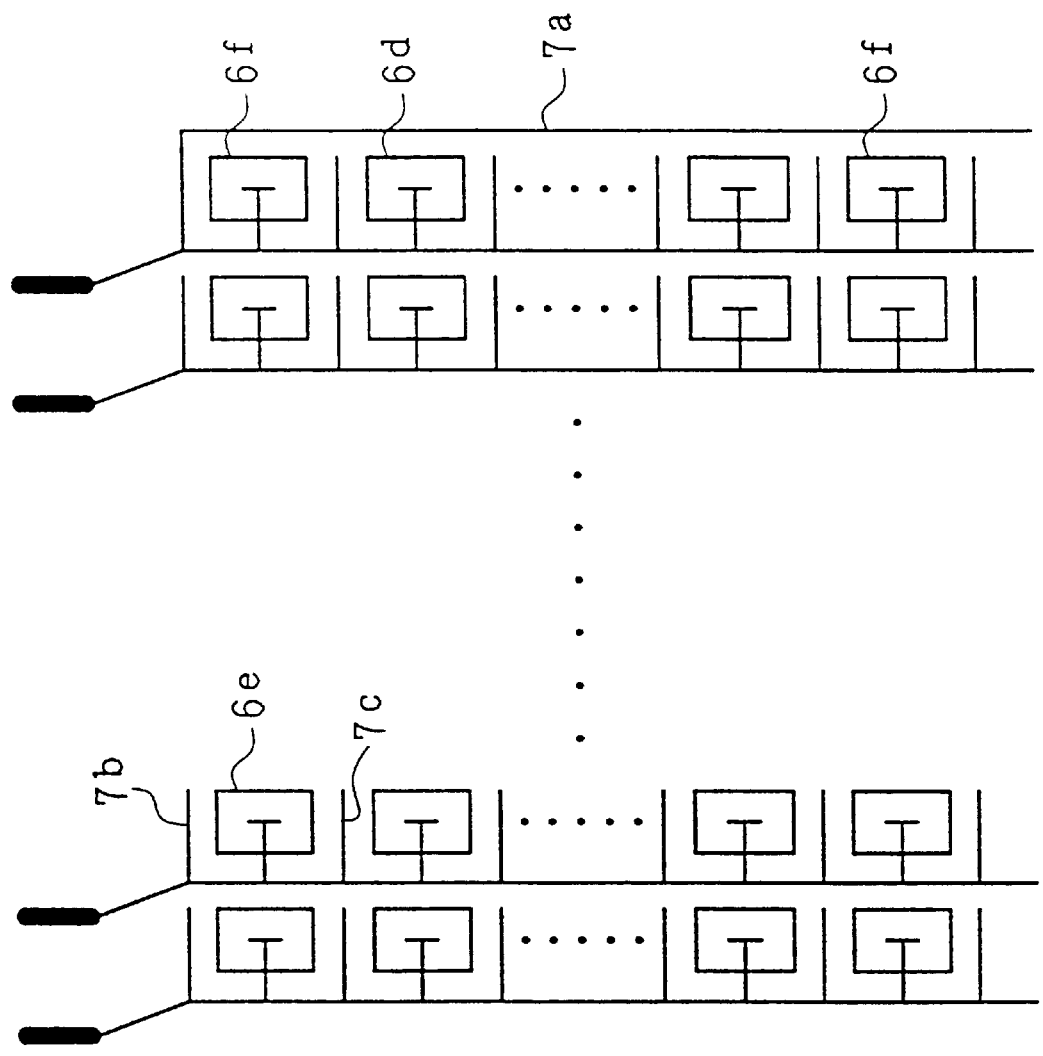
FIG. 6 is an explanatory drawing showing still another embodiment of the present invention and a pattern formation of pixels and wires in the liquid crystal display device.
Figure 7:
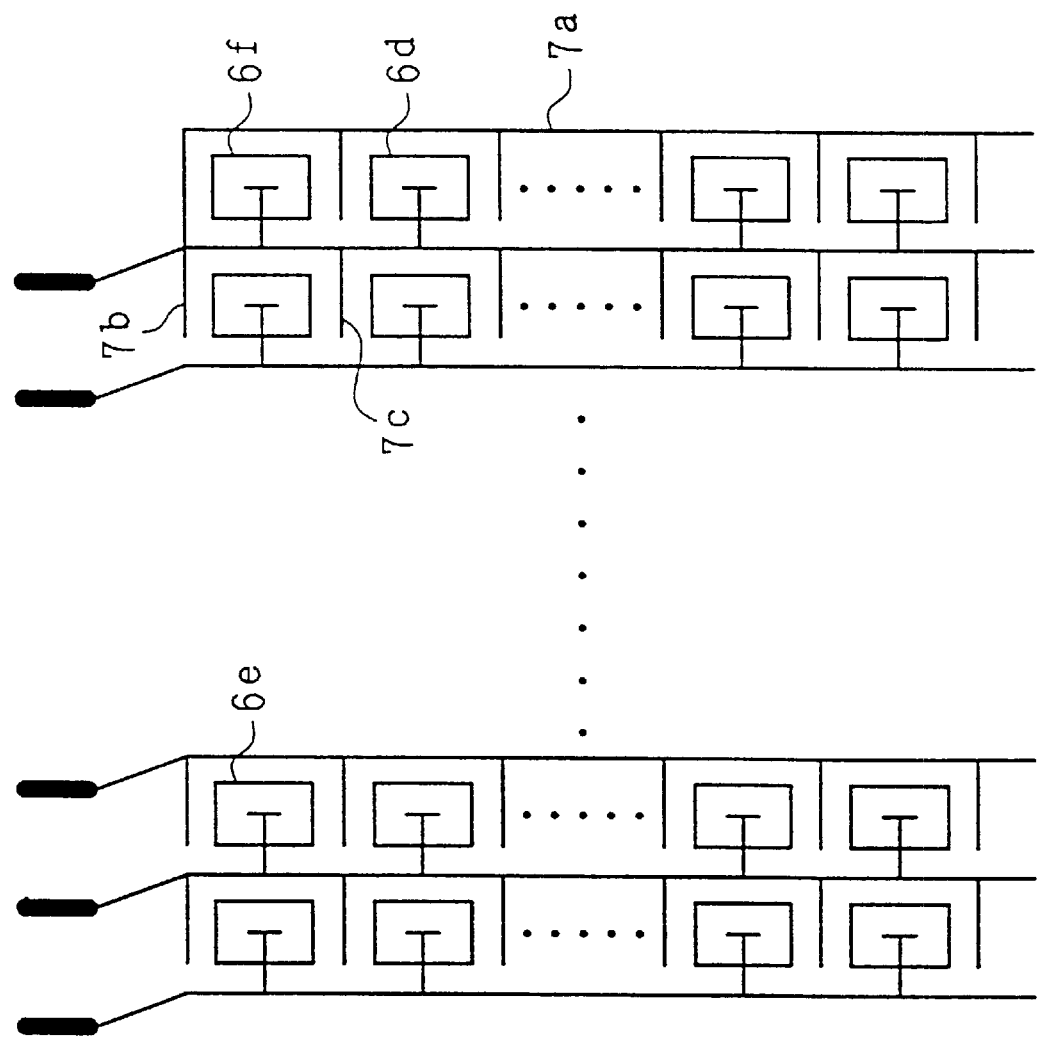
FIG. 7 is an explanatory drawing showing still another embodiment of the present invention and a pattern formation of pixels and wires in the liquid crystal display device.

Additionally, in the arrangements as shown in FIGS. 1 and 5, the dummy wires 7a and 7b are provided only for the pixel electrodes 6d through 6f which are disposed on the upper end, the lower end, and the right end. However, as shown in FIGS. 6 and 7, a dummy wire 7c (third dummy wire) is further allowed to be formed at all intervals between pixel electrodes which are arranged vertically.

As described above, the dummy wires are installed so as to provide even parasitic capacities which are added to the pixel electrodes of the pixels, with respect to all pixels in the liquid crystal panel. This makes it possible to provide an even lighting display for each pixel. Therefore, the display quality can be improved.

Figure 8:
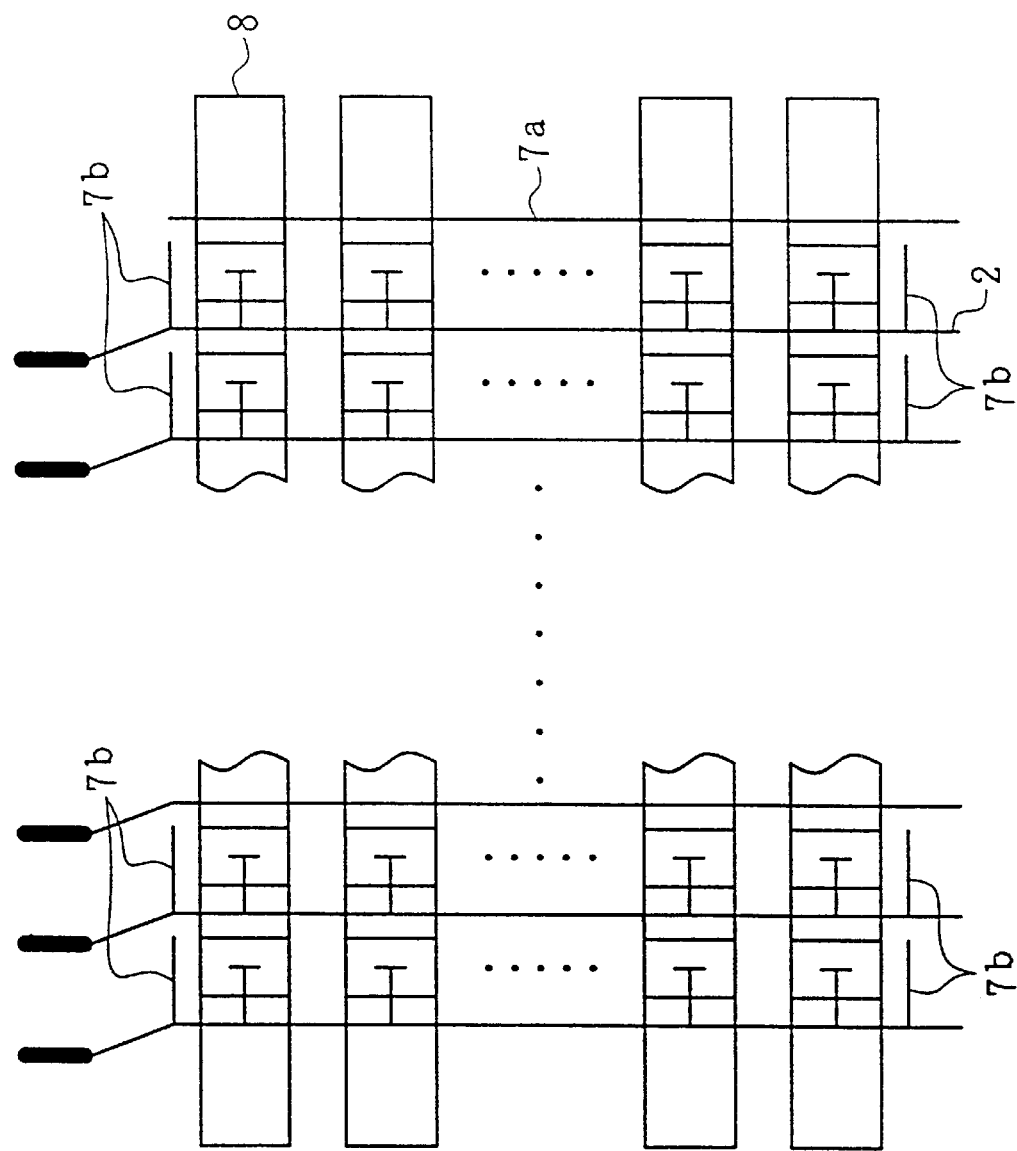
FIG. 8 is an explanatory drawing showing still another embodiment of the present invention and a pattern formation of pixels and wires in the liquid crystal display device.

Moreover, as described above, in the liquid crystal panel which uses the two-terminal element, in the case when the signal wire connected with the pixel is set as a data wire, a transparent electrode, which is arranged on the other transparent substrate, serves as a transparent scanning electrode. The transparent substrate opposes the substrate on which the pixel is formed. In this case, as shown in FIG. 8, electric charge is applied to the dummy wire 7a due to an electric effect of a transparent scanning electrode 8; therefore, it is not necessary to electrically connect the dummy wire 7a with the signal wire 2.

Figure 9:
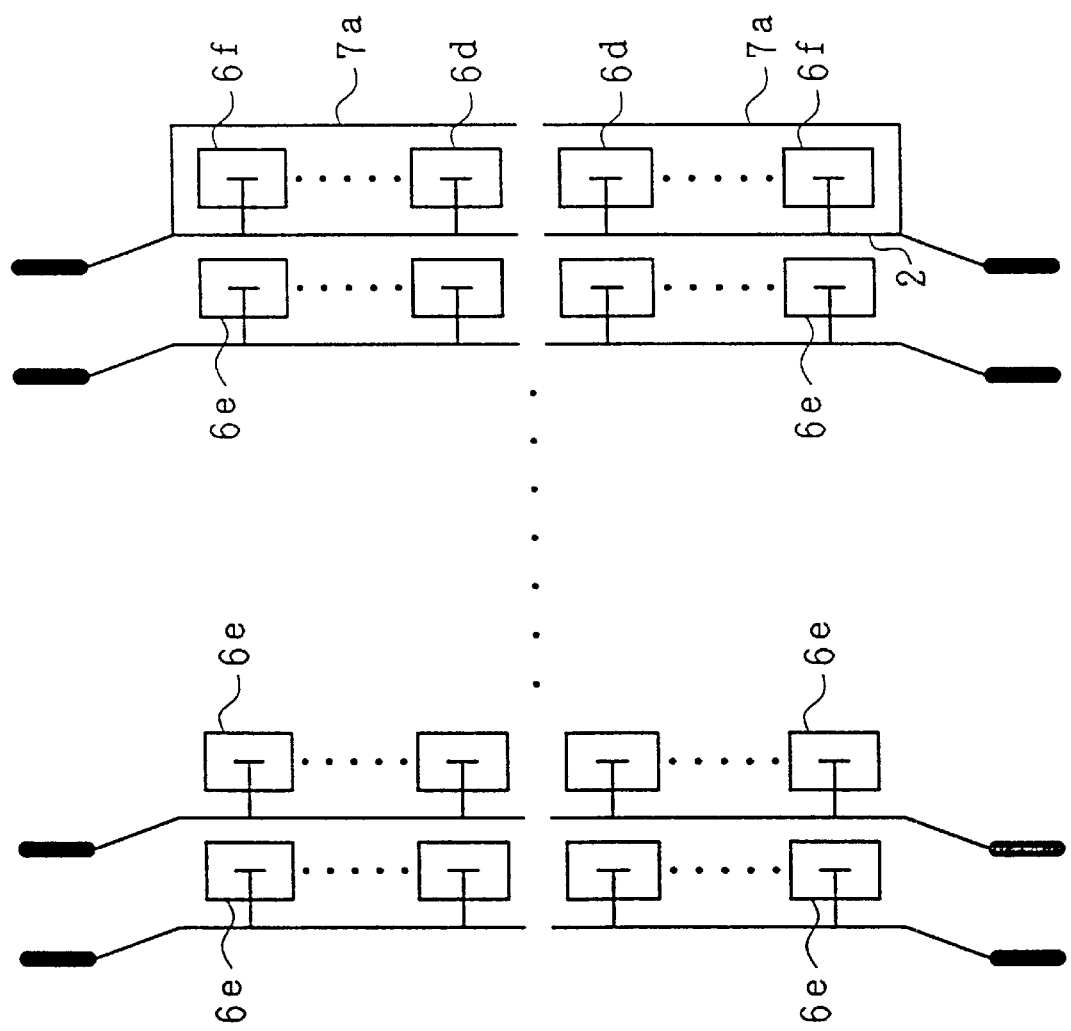
FIG. 9 is an explanatory drawing showing still another embodiment of the present invention and a pattern formation of pixels and wires in the liquid crystal display device.

Further, in the liquid crystal display device of the present embodiment, the dummy wire 7a is electrically connected with the neighboring signal wire 2. Therefore, for example, as shown in FIG. 9, even in the case of a liquid crystal panel with a centrally divided structure in which each signal wire 2 is divided at the center and a signal is inputted to each signal wire from above and below, an interval between pixels aligned with a division line located in between is not widened; consequently, this arrangement causes no demerit.

Figure 10:
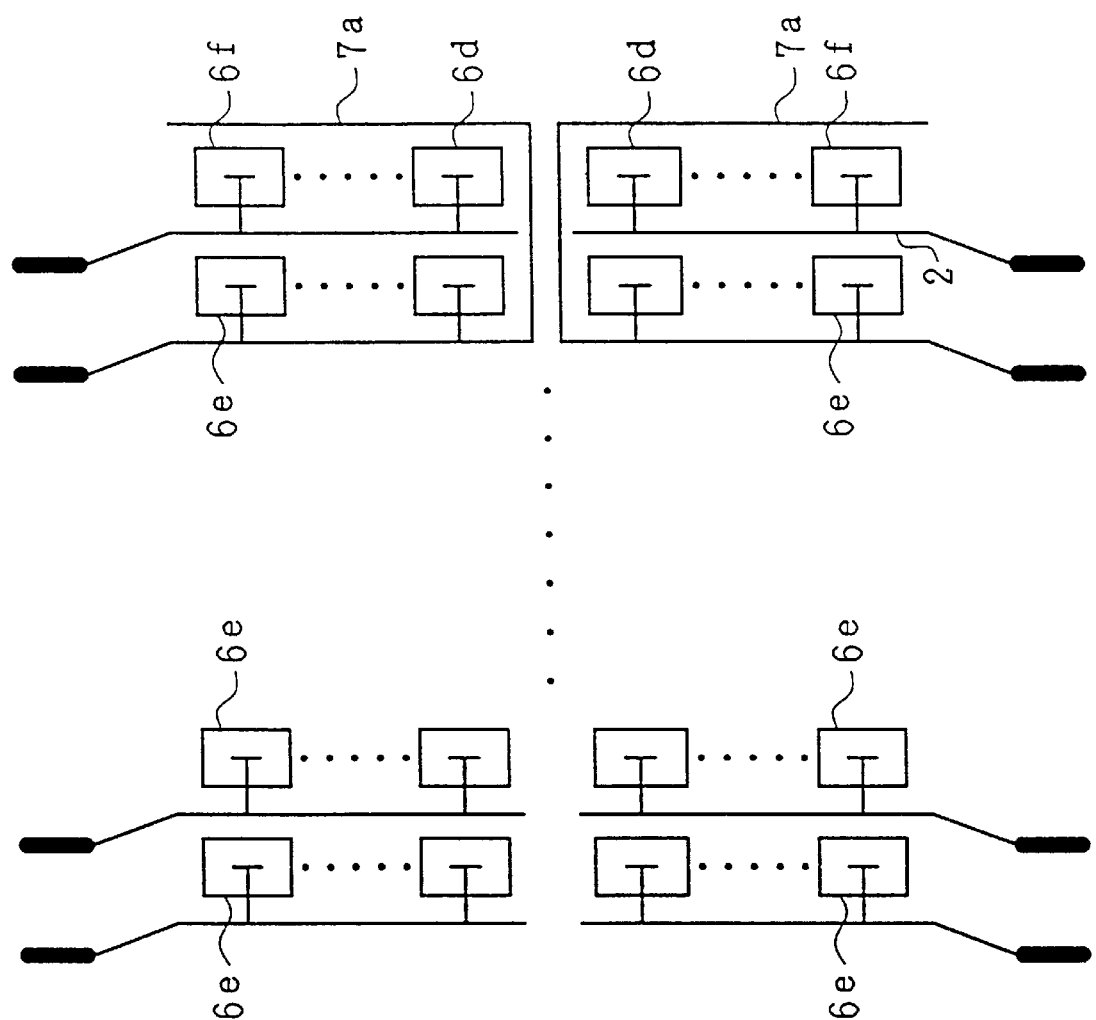
FIG. 10 is an explanatory drawing showing a comparative example of the construction of FIG. 9 and a pattern formation of pixels and wires in the liquid crystal display device.

That is, as shown in FIG. 10, in the case when the dummy wire 7a is further connected with a signal wire 2 which is on the left of the signal wire 2 adjacent to the dummy wire 7a (for example, in the case of a line reverse drive, this connection may be arranged), there is a problem: a dot pitch becomes greater at the divided part of the center, and it becomes difficult to realize this arrangement from the viewpoint of dimension. Further, the yield becomes smaller due to leak and others; consequently, the cost is increased. However, the arrangement in FIG. 9 does not cause this kind of problem.

[Embodiment 2]

Figure 11:
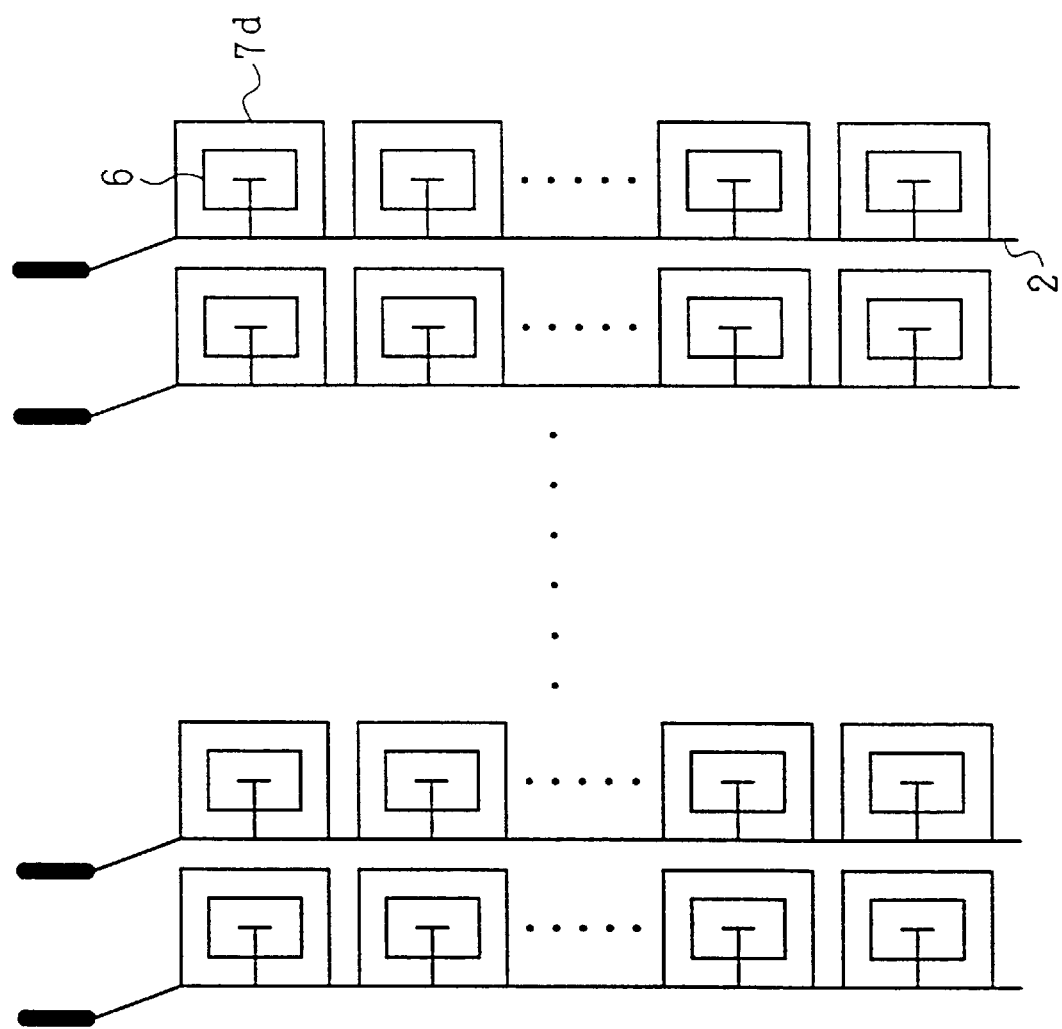
FIG. 11 is an explanatory drawing showing still another embodiment of the present invention and a pattern formation of pixels and wires in the liquid crystal display device.

Referring to FIG. 11, the following explanation will discuss another embodiment of the present invention. Further, with regard to the liquid crystal display device of the present embodiment, the construction of each pixel in the liquid crystal panel is the same as that of Embodiment 1 and the description thereof is omitted.

In the aforementioned liquid crystal panel, a dummy wire 7d is formed so as to apply even parasitic capacities to pixel electrodes 6 of the respective pixels. The dummy wire 7d, as shown in FIG. 11, is arranged so as to surround each pixel in the liquid crystal panel together with the signal wire 2.

In the arrangement of FIG. 11, the signal wire 2 which the pixel electrode 6 is connected with (specifically, 2a in FIG. 4) and the dummy wire 7d apply even parasitic capacities. This arrangement makes it possible to achieve an even lighting display for each pixel, thereby improving the display quality.

Furthermore, since wiring is doubled by the dummy wire 7d and the signal wire 2, it is possible to achieve redundancy, and to reduce wire resistance so that it becomes possible to decrease power consumption of the liquid crystal panel.

[Embodiment 3]

Referring to FIGS. 12 through 15, the following explanation will discuss still another embodiment of the present invention. Further, with regard to the liquid crystal display device of the present embodiment, the construction of each pixel in the liquid crystal panel is the same as that of Embodiment 1 and the description thereof is omitted.

Figure 12:
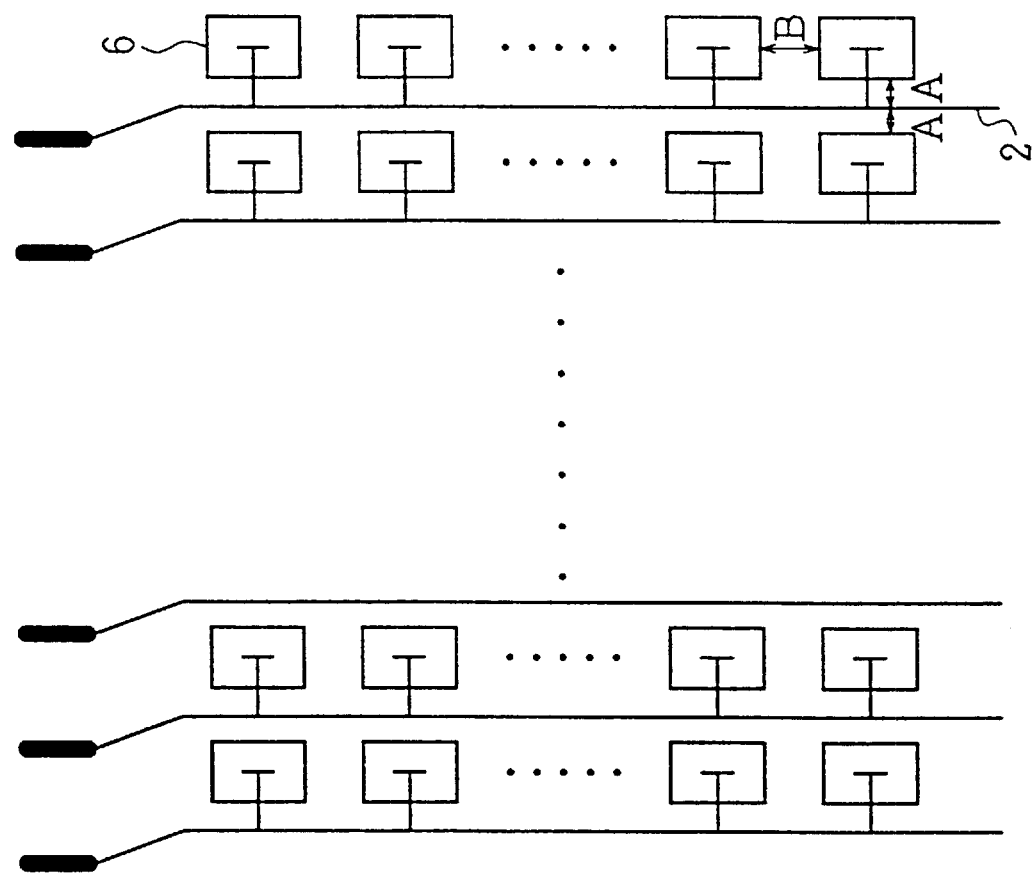
FIG. 12 is an explanatory drawing showing still another embodiment of the present invention and a pattern formation of pixels and wires in the liquid crystal display device.

Unlike Embodiments 1 and 2, as shown in FIG. 12, the aforementioned liquid crystal panel includes no dummy wire for applying even parasitic capacities to pixel electrodes 6 of the respective pixels.

In the arrangement of FIG. 12, with regard to the parasitic capacities C1 and C2, a sufficient interval is set between the pixel electrode 6 of each pixel and the signal wire 2 which is adjacent to the pixel electrode 6 (hereinafter, referred to as a line interval: indicated by an arrow A in FIG. 12). Therefore, the parasitic capacities C1 and C2 are reduced so as not to affect the image display. Further, with regard to the parasitic capacities C3 and C4, an interval is set sufficiently between the pixel electrodes 6 which are arranged vertically (hereinafter, referred to as a pixel interval: indicated by an arrow B in FIG. 12); therefore, the parasitic capacities C3 and C4 are reduced so as not to affect the image display.

Here, the following explanation will discuss a numerical limit for properly setting the line interval and pixel interval.

In the image display of the liquid crystal panel, when a contrast difference between pixels exceeds nearly 3%, the contrast difference is recognized by visual observation. Therefore, the following description assumes that the liquid crystal panel can provide a uniform lighting display when the contrast difference is less than 3%, and the objective is to set the contrast difference at less than 3%.

Figure 13:
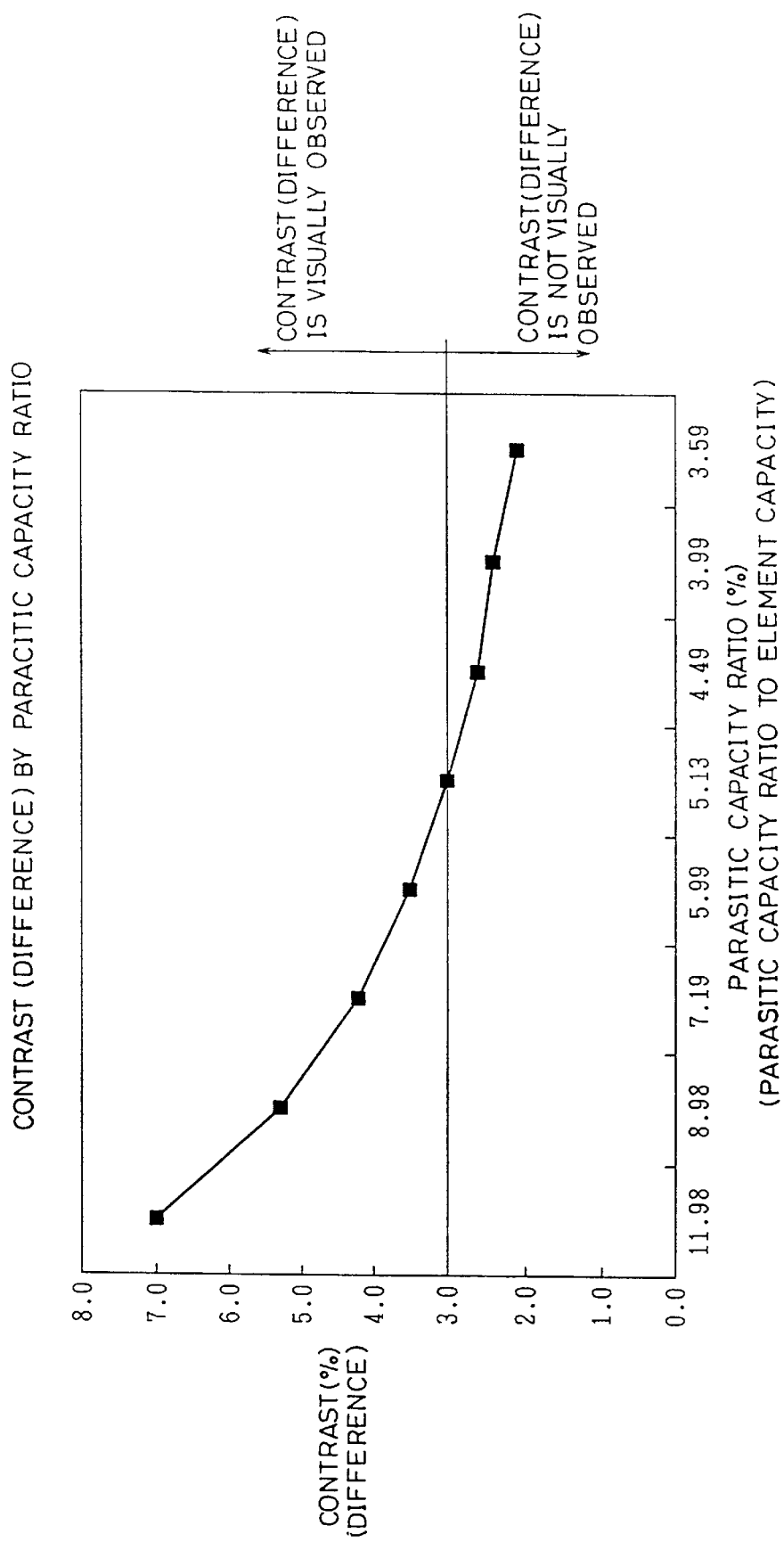
FIG. 13 is a graph which shows the relationship between a parasitic capacity ratio and a contrast difference.

FIG. 13 shows the relationship between a parasitic capacity ratio (a ratio of each parasitic capacity to an element capacity) and the contrast difference. As shown in FIG. 13, the parasitic capacity ratio is 5.13% in the case when the contrast difference is 3%. Thus, it is understood that the lighting display of each pixel can be uniform by setting the parasitic capacity ratio at not more than 5%.

Here, the following explanation describes how to obtain the interval between the pixel electrode 6 and the signal wire 2 and the interval between pixel electrodes 6 for satisfying the conditions of the numerical limit of the parasitic capacity ratio. Firstly, an example of calculation of the element capacity is explained as follows. Additionally, the following calculation is based on the assumption that the dot pitch: 0.24 mm, the pixel construction: 480×320 dots, and the panel size: approximately 5 inches.

<Calculation Example of an Element Capacity>

Considering the accuracy of a stepping projection aligner which is used for making a matrix substrate, and the capacity ratio, the area of an element is generally set at 3 $\mu$m×3 $\mu$m to 6 $\mu$m×6 $\mu$m. Here, the area is set at 4 $\mu$m×5 $\mu$m as a representative value. The dielectric constant of the anodic oxidation film 4 which is made of Ta on the lower electrode 3 is generally set at 18 to 24. Here, the dielectric constant is set at 20 as a representative value. Further, a vacuum dielectric constant $\epsilon_0$ is set at $8.86 \times 10^{-12}$ Fm$^{-1}$. Moreover, the film thickness of the anodic oxidation film 4 which is made of Ta is generally set at 300 to 1000 Å. Here, the film thickness is set at 600 Å as a representative value.

element capacity
$\approx 8.86 \times 10^{-12} \times (4 \times 10^{-6} \times 5 \times 10^{-6}) \times 20$
$\div (600 \times 10^{-10})$
$\approx 5.91 \times 10^{-14}$ F By the use of the obtained element capacity, in the liquid crystal panel in which the line interval and pixel interval vary, the parasitic capacity ratio to the element capacity is calculated by the use of the parasitic capacity which is calculated in a way shown in Embodiment 1. And then, a graph of FIG. 13 is plotted so as to determine a numerical limit. Further, in FIG. 13, the plot of the 11.98% parasitic capacity ratio corresponds to the case when the line interval and the pixel interval are 3 $\mu$m, and the plot of the 3.59% parasitic capacity ratio corresponds to the case when the line interval and the pixel interval are 10 $\mu$m. Moreover, the other plots between these two plots are set at intervals of 1 $\mu$m of the line interval and the pixel interval. Namely, according to FIG. 13, in the condition as defined in the present embodiment, when the line interval and the pixel interval are not less than 7 $\mu$m, the contrast difference can be set at not more than 3%.

As described above, sufficient line intervals and pixel intervals are obtained (parasitic capacity is reduced) so that it becomes possible to solve the uneven lighting display caused by uneven parasitic capacities. Further, at the same time, it is possible to reduce drive voltage for lighting; consequently, low power consumption can be realized.

Figure 14:
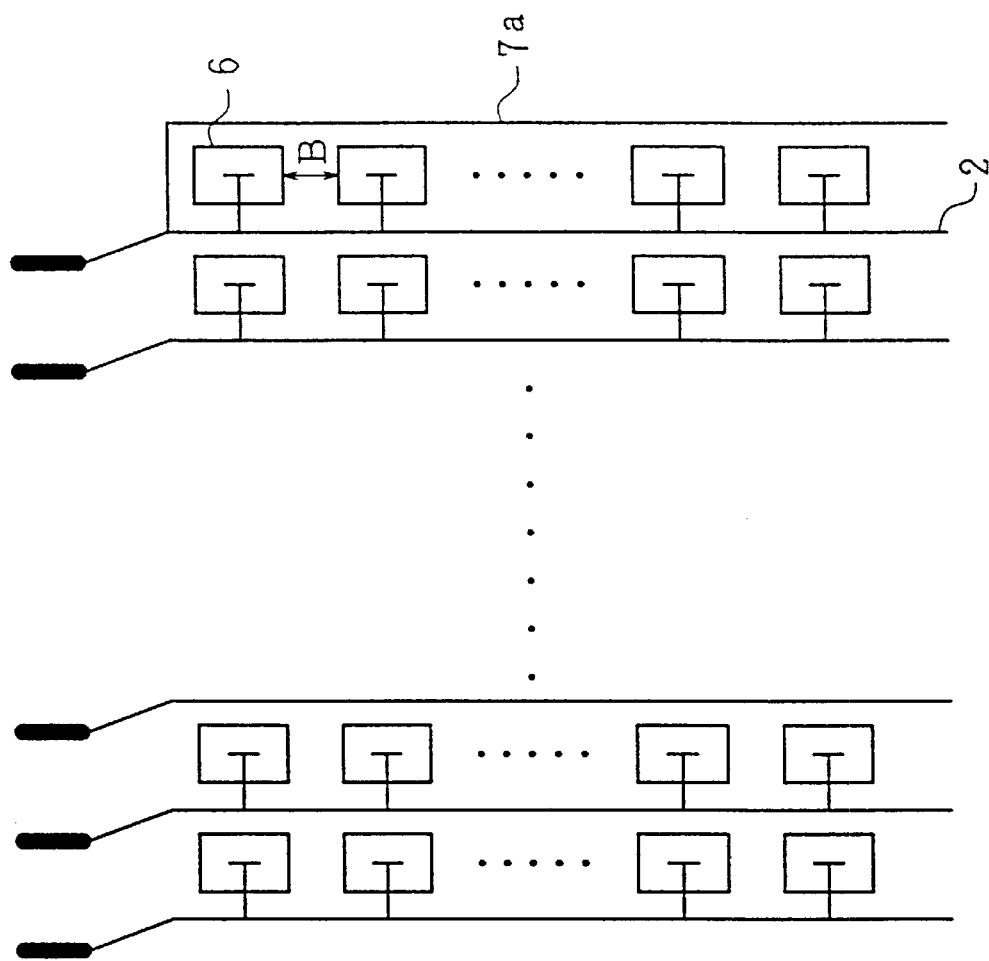
FIG. 14 is an explanatory drawing showing still another embodiment of the present invention and a pattern formation of pixels and wires in the liquid crystal display device.
Figure 15:
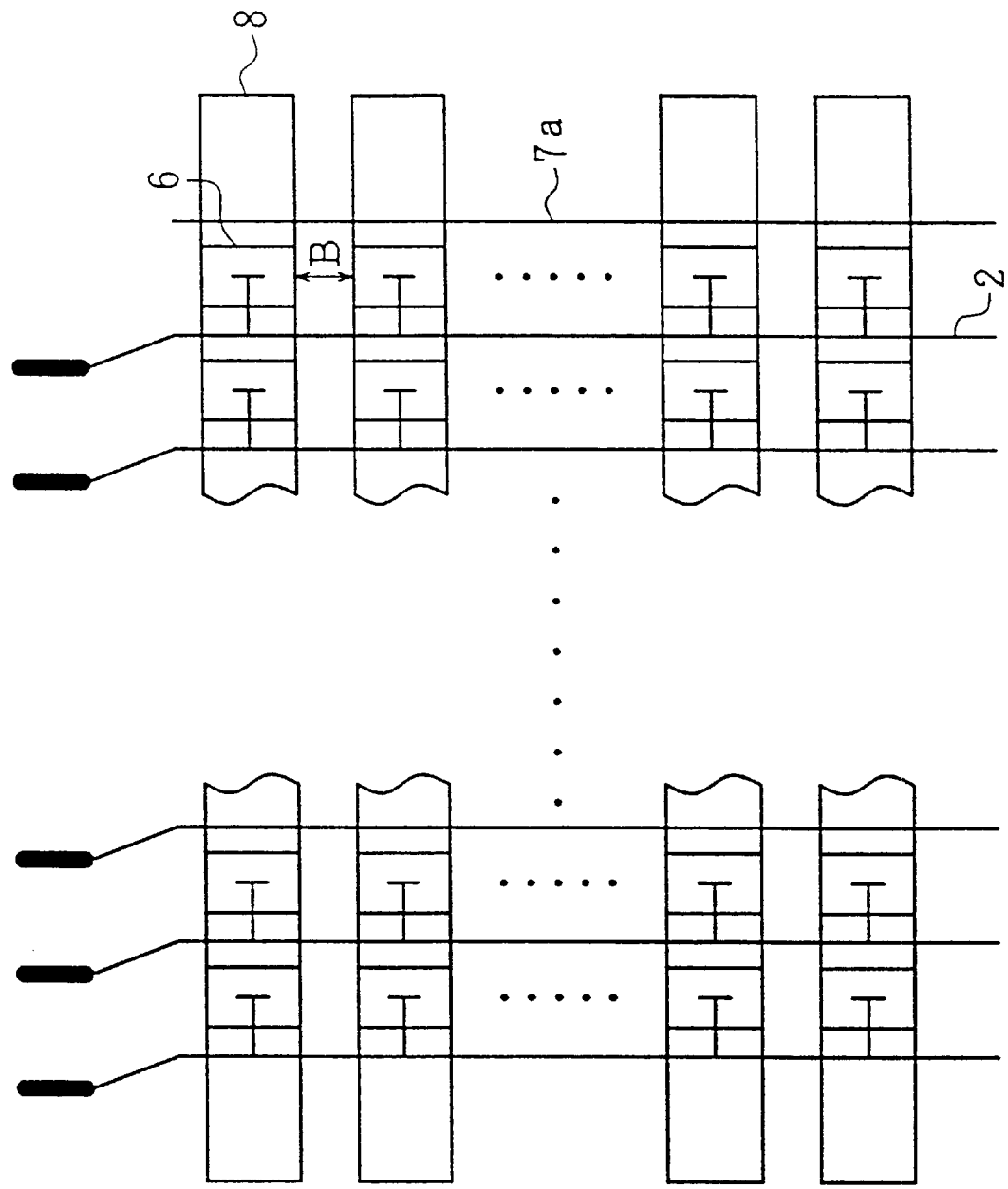
FIG. 15 is an explanatory drawing showing still another embodiment of the present invention and a pattern formation of pixels and wires in the liquid crystal display device.

Moreover, with the arrangement of FIG. 12, sufficient line intervals and pixel intervals are obtained so as to reduce the influence of the parasite capacities C1 through C4. Therefore, it is possible to eliminate the need for arranging a dummy wire. However, as shown in FIGS. 14 and 15, the following arrangement is also allowed: the dummy wire 7a is formed so as to provide the even parasitic capacities C1 and C2 with regard to all pixels, and the pixel intervals (indicated by an arrow B in FIGS. 14 and 15) are widened with regard to the parasitic capacities C3 and C4 so that it becomes possible to reduce the influence of the parasitic capacities C3 and C4. Of course, contrary to this arrangement, the following arrangement is further allowed: the dummy wire 7b is formed so as to provide the even parasitic capacities C3 and C4 with regard to all pixels, and, with regard to the parasitic capacities C1 and C2, the line intervals are widened so that it becomes possible to reduce the influence of the parasitic capacities C1 and C2.

[Embodiment 4]

The aforementioned Embodiments 1 through 3 discussed a liquid crystal display device using a two-terminal element in which a parasitic capacity affects greatly. The present embodiment will describe a liquid crystal display device with a simple-matrix driving system.

Figure 16:
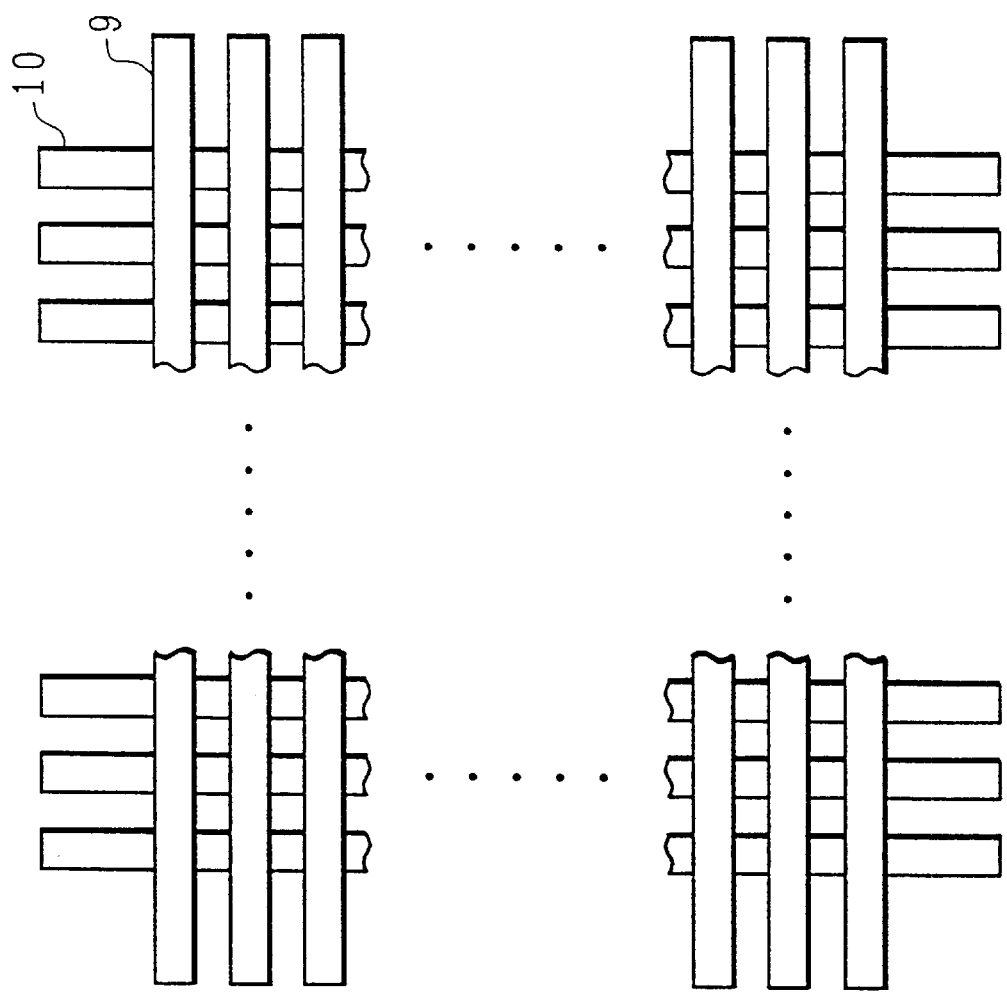
FIG. 16 is an explanatory drawing showing a pattern formation of electrodes in a conventional liquid crystal display device with a simple-matrix system.

Firstly, FIG. 16 shows a conventional liquid crystal display device with the simple-matrix system. As shown in FIG. 16, in the liquid crystal display device with the simple-matrix system, segment electrodes 9 and common electrodes 10 are formed on each of a pair of transparent substrates which oppose each other (not shown). The segment electrodes 9 and the common electrodes 10 are arranged so as to intersect one another.

With the aforementioned arrangement, a parasitic capacity appears in any of the segment electrodes 9 and the common electrodes 10 due to the influence of neighboring electrodes. In this case, with regard to any electrode except for electrodes disposed on ends, the parasitic capacities are applied from electrodes disposed on both sides. However, with regard to each of the electrodes disposed on ends, a neighboring electrode exists only on one side. Therefore, the parasitic capacity which is applied to each of the electrodes disposed on ends becomes smaller than the parasitic capacities applied to the electrode which is not disposed on ends, resulting in an uneven lighting display.

Figure 17:
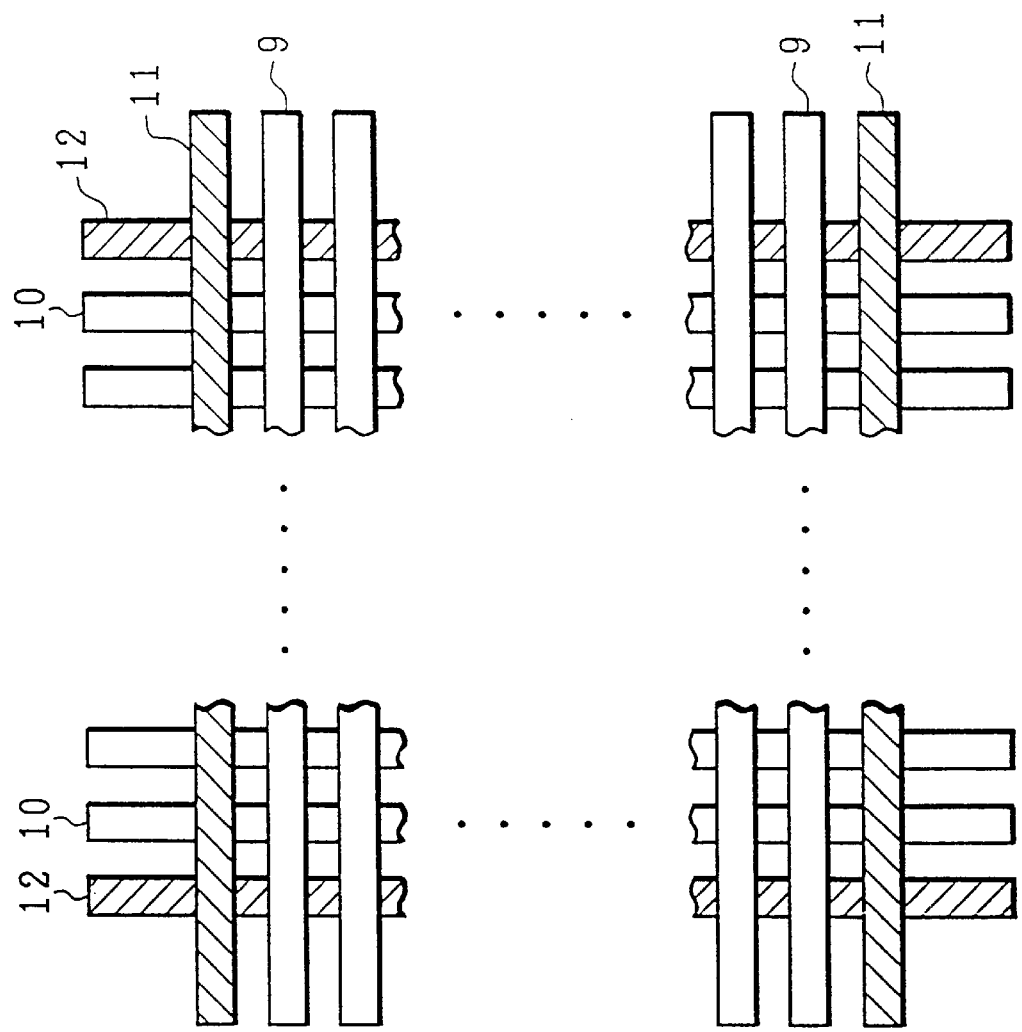
FIG. 17 is an explanatory drawing showing still another embodiment of the present invention and a pattern formation of electrodes in the liquid crystal display device with the simple-matrix system.

Hence, in the liquid display device of the present embodiment, in order to solve the uneven lighting display, as shown in FIG. 17, dummy wires 11 and 12 (electrodes indicated by slanting lines in FIG. 17) are provided on the outside of the segment electrodes 9 and the common electrodes 10 that are disposed on ends.

With this arrangement, with regard to both of the segment electrode 9 and the common electrode 10, it is possible to obtain a uniform parasitic capacity of the electrode disposed on ends as well as of the electrode which is not disposed on ends. Therefore, an even lighting display can be realized.

Figure 18:
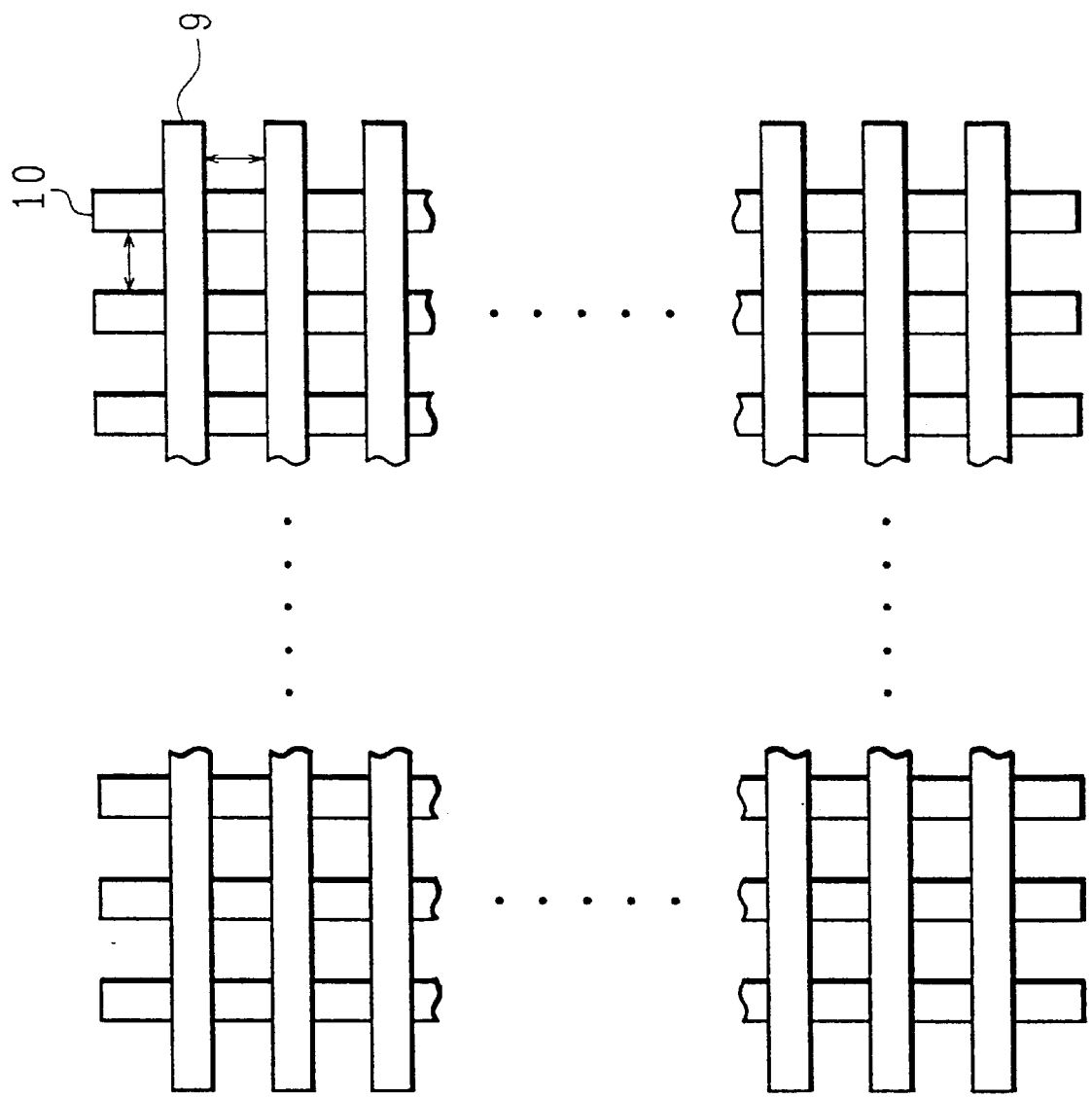
FIG. 18 is an explanatory drawing showing still another embodiment of the present invention and a pattern formation of electrodes in the liquid crystal display device with the simple-matrix system.
Figure 19:
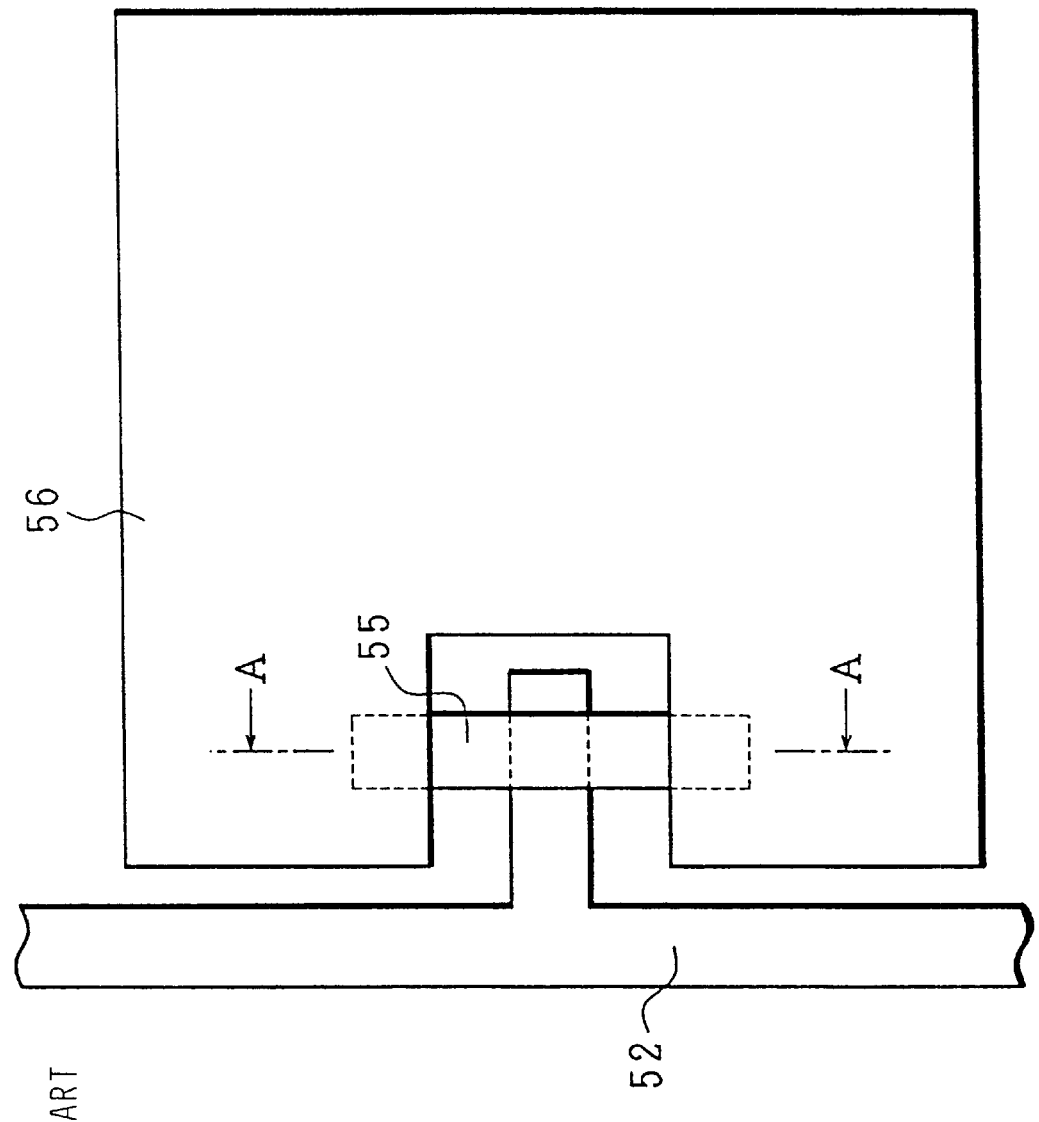
FIG. 19 is a top view showing the construction of a pixel which uses the two-terminal element as a switching element.
Figure 20:
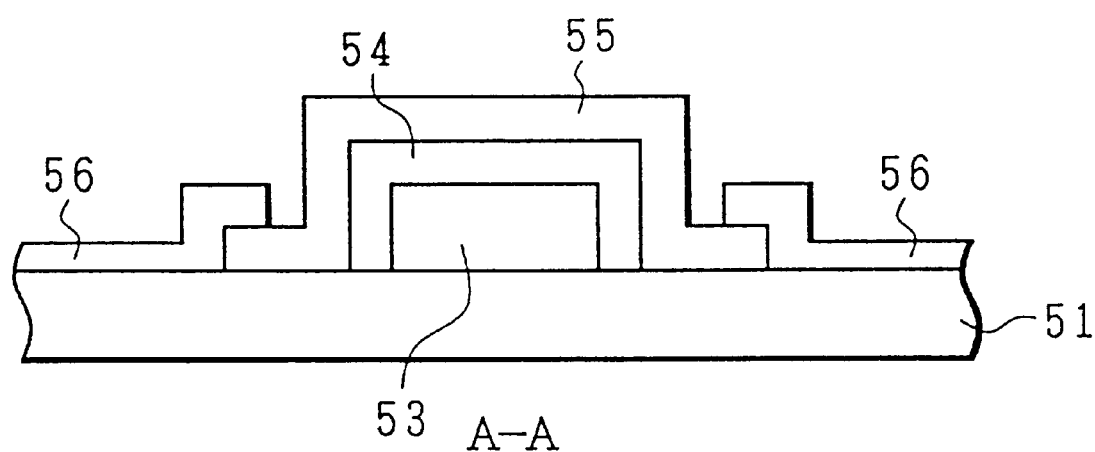
FIG. 20 is an A—A cross section of the pixel.
Figure 21:
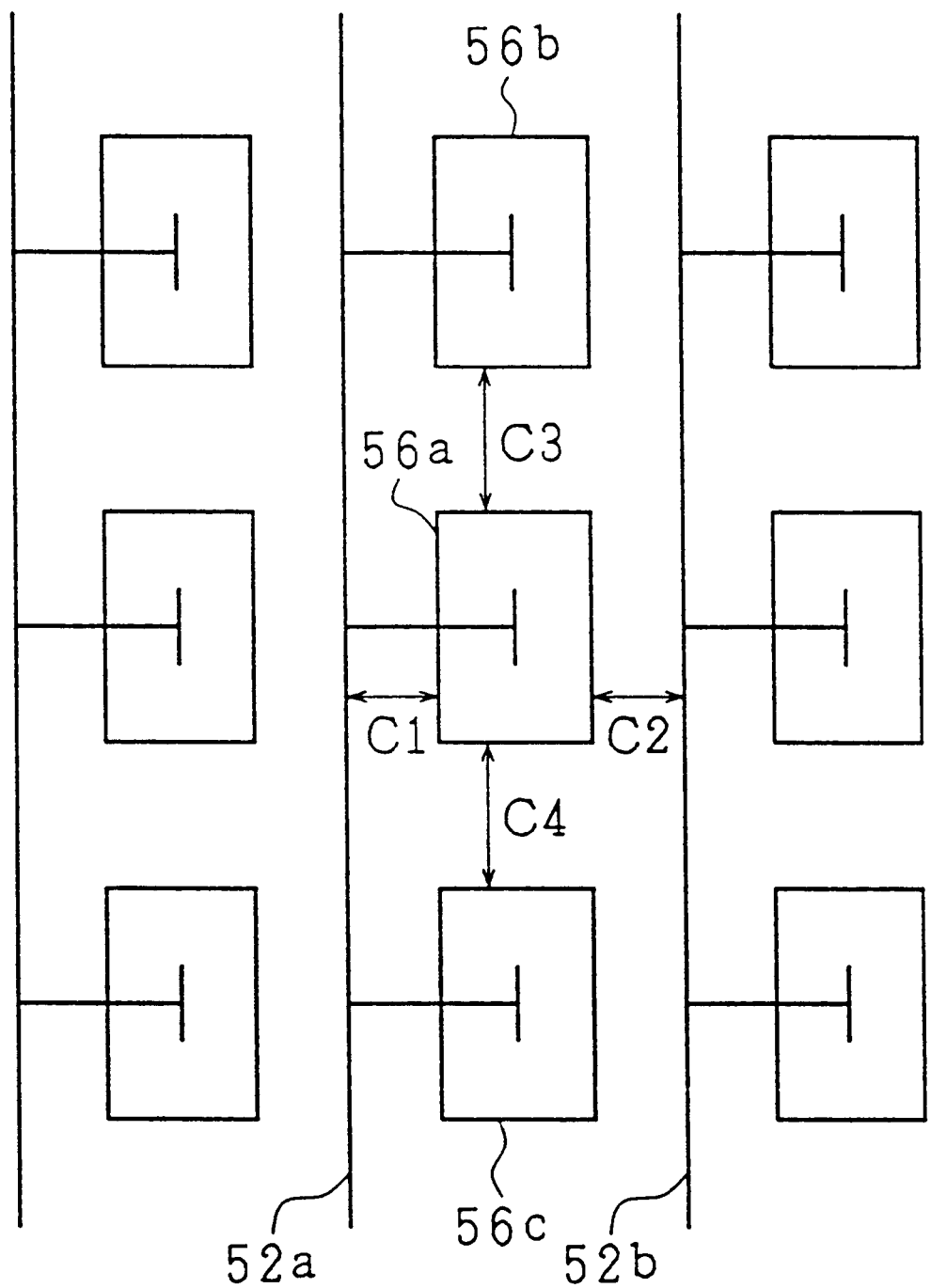
FIG. 21 is an explanatory drawing showing parasitic capacities applied to a sample pixel.

Further, besides the arrangement shown in FIG. 17, in the arrangement shown in FIG. 18, with regard to the segment electrode 9 and the common electrode 10, intervals between neighboring electrodes (indicated by an arrow in FIG. 18) are widened sufficiently so as to reduce the parasitic capacity between electrodes to a degree at which the display is not affected. Therefore, an even lighting display can be realized.

As described above, in the aforementioned embodiments, (1) by providing a dummy wire for obtaining an even parasitic capacity which is applied to each pixel electrode, (2) or expanding an interval between a neighboring pixel and a signal wire or an interval between neighboring pixels, the influence of capacity applied to each pixel electrode is reduced so as to realize an even lighting display of the liquid crystal display device.

With the aforementioned embodiments, it becomes possible to solve the uneven lighting display merely by changing a masking pattern without increasing the number of processes and the cost.

Namely, the liquid crystal display device of Embodiment 1, in which a plurality of pixels forming a display screen are arranged in a matrix form and all pixels forming each pixel line are connected with a signal wire 2 for each of the pixel lines, is provided with the dummy wire 7a which is formed on the outside of the final pixel line with no neighboring signal wire other than a signal wire 2a being connected with the final pixel line, and which applies to pixel electrodes 6d and 6f disposed on the final pixel line the same amount of parasitic capacity as a between-line parasitic capacity which is applied from a neighboring signal wire (in other words, the parasitic capacity applied from a signal wire 2b), wherein the dummy wire 7a is electrically connected with the neighboring signal wire (in other words, a signal wire 2a with regard to the pixel electrodes 6d and 6f).

With the aforementioned arrangement, the dummy wire 7a applies to the pixel electrodes 6d and 6f disposed on the final pixel line the same amount of parasitic capacity as the between-line parasitic capacity which is applied from a neighboring signal wire. Therefore, with regard to the pixel electrodes 6d and 6f, it is possible to apply the same amount of parasitic capacity as other pixel electrodes.

With this arrangement, it becomes possible to solve the uneven image display which has been caused by the difference in parasitic capacity applied to each of the pixel electrodes. Consequently, an even lighting display can be realized. Further, since the dummy wire 7a is electrically connected with the neighboring signal wire, it is easy to arrange wires. For example, even in the case of a liquid crystal display device with a centrally divided structure, this arrangement does not cause the expansion of dot pitch in a central divided portion, the decrease of yield, and other demerits.

Moreover, it is desirable that the liquid crystal display device is further provided with the dummy wire 7b which is formed on the outside of the pixels disposed on both ends of the pixel lines being connected with the respective signal wires. This dummy wire 7b applies, to the pixel electrodes 6e and 6f of the pixels disposed on both ends, the same amount of parasitic capacity as a between-pixel parasitic capacity which is applied from the neighboring pixel electrode (in other words, pixel electrodes 6b or 6c with regard to pixel electrodes 6e or 6f).

With the aforementioned arrangement, the dummy wire 7b applies the same amount of parasitic capacity as the between-pixel parasitic capacity which is applied from the neighboring pixel electrode to the pixel electrodes 6e and 6f. Therefore, with regard to the pixel electrodes 6e and 6f, it is possible to apply the same amount of parasitic capacity as other pixel electrodes.

With this arrangement, it is possible to solve the uneven image display which has been caused by the difference in parasitic capacity applied to each of the pixel electrodes. Consequently, an even lighting display can be realized.

Further, the liquid crystal display device is allowed to be arranged so that each signal wire 2 is divided at the center and a signal is inputted to each signal wire 2 from above and below.

With the aforementioned arrangement, even the liquid crystal display device having the centrally divided structure in which each signal wire 2 is divided at the center and a signal is inputted to each signal wire 2 from above and below, does not cause any inconvenience such as the expansion of dot pitch in a central divided portion. This makes it possible to solve the uneven image display which has been caused by the difference in parasitic capacity applied to each of the pixel electrodes. Consequently, an even lighting display can be realized.

Further, the liquid crystal display device is allowed to be arranged as follows: a liquid crystal display device in which a plurality of pixels forming a display screen are arranged in a matrix form and all pixels forming each pixel line are connected with a signal wire 2 for each of the pixel lines, is provided with (a) the dummy wire 7a which is formed on the outside of the final pixel line with no neighboring signal wire other than a signal wire 2a being connected with the final pixel line and which applies to pixel electrodes 6d and 6f disposed on the final pixel line the same amount of parasitic capacity as the between-line parasitic capacity which is applied from the neighboring signal wire, and (b) a transparent scanning electrode 8 which is formed on a transparent substrate opposing the substrate on which the dummy wire 7a is formed, wherein the dummy wire 7a is not electrically connected with other signal wires.

With the aforementioned arrangement, the dummy wire 7a is not electrically connected with other signal wires. However, since the transparent scanning electrode 8 generates electric charge due to an electric effect, it is possible to apply to a pixel the same amount of parasitic capacity as the signal wire applies. Therefore, the dummy wire 7a does not make a complex wiring pattern on the substrate, thereby preventing the yield from decreasing due to leak and others.

Furthermore, with regard to the liquid crystal display device of Embodiment 2 in which a plurality of pixels forming the display screen are arranged in a matrix form and all pixels forming each pixel line are connected with a signal wire 2 for each of the pixel lines, each of the pixel electrodes which constitute the display screen is surrounded by the dummy wires 7d having an identical shape.

With the aforementioned arrangement, all pixel electrodes are surrounded by the dummy wires 7d having an identical shape. Therefore, with regard to pixel electrodes of all pixels, it is possible to apply even parasitic capacities.

With this arrangement, it is possible to solve the uneven image display which has been caused by the difference in parasitic capacity applied to each of the pixel electrodes. Consequently, an even lighting display can be realized. Further, since the signal wire 2 is doubled by the dummy wire 7a, it is possible to achieve redundancy, and to reduce the resistance of the signal wire so that it becomes possible to decrease power consumption of the liquid crystal display device.

Moreover, with regard to the liquid crystal display device of Embodiments 1 and 2, it is possible to obtain the most remarkable effect in the case when the pixel uses an MIM element as a switching element so as to be connected in series with the pixel electrode.

Namely, with regard to the liquid crystal display device using an MIM element as a switching element which causes the most serious defect in display in the event of uneven parasitic capacity applied to each of the pixel electrodes, it is possible to solve the uneven image display; consequently, an even lighting display can be realized.

Furthermore, the liquid crystal display device of Embodiment 3, in which a plurality of pixels forming a display screen are arranged in a matrix form and all pixels forming each pixel line are connected with a signal wire 2 for each of the pixel lines, is characterized in that intervals between pixel electrodes on each pixel line as well as intervals between pixel electrodes disposed on each pixel line and the signal wires 2 which are adjacent to the pixel electrodes are expanded so that the parasitic capacities applied to the respective pixel electrodes do not affect the display image.

With the above-mentioned arrangement, intervals between pixel electrodes on the respective pixel lines as well as intervals between pixel electrodes disposed on each pixel line and the signal wires 2 which are adjacent to the pixel electrodes are expanded so that the influence of parasitic capacity is reduced for each pixel electrode. Therefore, it is possible to solve the uneven image display which has been caused by the difference in parasitic capacity. Consequently, an even lighting display can be realized. Further, at the same time, it is possible to reduce the driving voltage for lighting so as to achieve low power consumption.

The liquid crystal display device is allowed to be arranged as follows: a liquid crystal display device, in which a plurality of pixels forming a display screen are arranged in a matrix form and all pixels forming each pixel line are connected with a signal wire 2 for each of the pixel lines, is provided with either (a) the dummy wire 7a which is formed on the outside of the final pixel line with no signal wire other than a signal wire 2a being connected with the final pixel line, and which applies to pixel electrodes 6d and 6f disposed on the final pixel line the same amount of parasitic capacity as a between-line parasitic capacity which is applied from the neighboring signal wire, or (b) the dummy wire 7b which is formed on the outside of the pixels disposed on both ends of the pixel lines being connected with the respective signal wires, and which applies to the pixel electrodes 6e and 6f of the pixels disposed on both ends the same amount of parasitic capacity as the between-pixel parasitic capacity which is applied from the neighboring pixel electrodes. Therefore, either the between-line parasitic capacity or the between-pixel parasitic capacity can be arranged so as to be uniform for each pixel electrode. Further, with regard to parasitic capacities which are not added by the dummy wires, those parasitic capacities applied to the respective pixel electrodes are reduced to such an extent that they do not affect the display image by sufficiently expanding intervals between pixel electrodes on each pixel line, or intervals between pixel electrodes disposed on each pixel line and the signal wires 2 which are adjacent to pixel electrodes.

With the above-mentioned arrangement, the dummy wire 7a or 7b is provided so that it is possible to evenly apply the between-line parasitic capacity or the between-pixel parasitic capacity to each pixel electrode. Further, with regard to the parasitic capacities which are not added by the dummy wire, those parasitic capacities can be reduced in their influence by sufficiently expanding intervals between pixel electrodes on each pixel line, or intervals between pixel electrodes disposed on each pixel line and the signal wires 2 which are adjacent to pixel electrodes.

With this arrangement, it is possible to solve the uneven image display that has been caused by the difference in parasitic capacity applied to each of the pixel electrodes. Consequently, an even lighting display can be realized.

Further, in the aforementioned liquid crystal display device, the pixel uses an MIM element, which is connected with the pixel electrode in series, as a switching element. It is desirable that each parasitic capacity is not more than 5% with regard to the element capacity; with the parasitic capacity appearing between pixel electrodes on each pixel line, and the parasitic capacity appearing between the pixel electrodes disposed on each pixel line and the signal wires that are adjacent to the pixel electrodes.

With the aforementioned arrangement, each parasitic capacity is set not more than 5% with regard to the element capacity: with the parasitic capacity appearing between pixel electrodes disposed on the respective pixel lines, and the parasitic capacity appearing between the pixel electrodes on respective pixel lines and the signal wires that are adjacent to pixel electrodes, so that the parasitic capacities can be positively reduced so as not to affect the image display.

Moreover, with regard to the liquid crystal display device of Embodiment 4, in the liquid crystal display device with the simple-matrix system, in which a plurality of the common electrodes 10 and a plurality of the segment electrodes 9 are disposed so as to intersect one another, at least the common electrode 10 or the segment electrode 9 is provided with the dummy wire 11 or 12 on the outside of the electrodes disposed on ends, in parallel with the neighboring electrode.

With the aforementioned arrangement, with regard to all electrodes, it is possible to achieve even parasitic capacities which appear between electrodes.

With this arrangement, it is possible to solve the uneven image display that has been caused by the difference in parasitic capacity applied to each of the pixel electrodes. Consequently, an even lighting display can be realized.

Furthermore, the following arrangement is also preferable: in the liquid crystal display device with the simple-matrix system, in which a plurality of the common electrodes 10 and a plurality of the segment electrodes 9 are disposed so as to intersect one another, with regard to at least the common electrode 10 or the segment electrode 9, the intervals between electrodes are sufficiently expanded so that the parasitic capacities applied to the respective electrodes do not affect the image display.

With the aforementioned arrangement, it is possible to reduce the parasitic capacities applied to the respective electrodes so as not to affect the image display.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A liquid crystal display device, in which a plurality of pixels forming a display screen are arranged in a matrix form and in which all pixels forming a pixel line are connected with an address line for each of the pixel lines, comprising:
    a dummy wire which protrudes from the address line, each pixel being formed in a manner so as to be surrounded by the address lines and the dummy wire so that parasitic capacity is evenly applied to each of the pixels,
    wherein the dummy wire surrounding each pixel has an identical shape, and
    wherein the address line is doubled in such a manner that the address line and the dummy wire form a closed loop around each pixel.

2. The liquid crystal display device as defined in claim 1, wherein said pixel uses an MIM element which is connected with a pixel electrode in series, as a switching element.

3. A liquid crystal display device, in which a plurality of pixels forming a display screen are arranged in a matrix form and in which all pixels forming a pixel line are connected with an address line for each of the pixel lines, comprising:
    a first dummy wire which protrudes from the address line, each pixel being formed in a manner so as to be surrounded by the address lines and the first dummy wire so that parasitic capacity is evenly applied to each of the pixels,
    a second dummy wire which is formed on an outside of a pixel disposed on one of ends of the pixel lines connected with said respective address lines, and which applies to a pixel electrode of the pixel disposed on the one of the ends the same amount of parasitic capacity as a between-pixel capacity which is applied from a neighboring pixel electrode, wherein the first dummy wire is provided between neighboring pixel electrodes of the pixel line being connected with each of said address lines so as to evenly apply parasitic capacity to the neighboring pixel electrodes.

4. The liquid crystal display device as defined in claim 3, wherein said pixel uses an MIM element which is connected with the pixel electrode in series, as a switching element.

5. A liquid crystal display device, in which a plurality of pixels forming a display screen are arranged in a matrix form and in which all pixels forming a pixel line are connected with an address line for each of the pixel lines, comprising:

a dummy wire which protrudes from the address line, each pixel being formed in a manner so as to be surrounded by the address lines and the dummy wire so that parasitic capacity is evenly applied to each of the pixels, wherein the dummy wire includes:

a first dummy wire which is formed on an outside of a final pixel line with no neighboring address line other than an address line connected with the final pixel line; and a second dummy wire which is provided between neighboring pixel electrodes of the pixel line connected with each of said address lines, wherein said first dummy wire and said second dummy wire are electrically connected with the respective neighboring address lines, and wherein each pixel of said final pixel line is surrounded by the address line connected with said final pixel line, said first dummy wire and said second dummy wires, and each pixel of the pixel line other than said final pixel line is surrounded by the address lines and said second dummy wires.

6. A liquid crystal display device, in which a plurality of pixels forming a display screen are arranged in a matrix form and in which all pixels forming a pixel line are connected with an address line for each of the pixel lines, comprising:

a first dummy wire which is formed on an outside of a final pixel line with no neighboring address line other than an address line connected with the final pixel line, and which applies to a pixel electrode disposed on the final pixel line the same amount of parasitic capacity as a between-line parasitic capacity which is applied from the neighboring address line;

a second dummy wire which is formed on the outside of the pixel disposed on one of ends of the pixel lines connected with said respective address lines, and which applies to the pixel electrode of the pixel disposed on the one of the ends the same amount of parasitic capacity as a between-pixel capacity which is applied from the neighboring pixel electrode; and a transparent opposing electrode which is formed on a transparent substrate opposing a substrate on which said first dummy wire and said second dummy wire are formed, wherein said first dummy wire is not electrically connected with other address lines.

* * * * *